(12) United States Patent
Yokoyama

(10) Patent No.: US 9,203,262 B2
(45) Date of Patent: Dec. 1, 2015

(54) STORAGE CONTROL APPARATUS AND STORAGE CONTROL METHOD

(75) Inventor: Masayuki Yokoyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 626 days.

(21) Appl. No.: 13/505,969

(22) PCT Filed: Nov. 9, 2010

(86) PCT No.: PCT/JP2010/069931
§ 371 (c)(1),
(2), (4) Date: May 3, 2012

(87) PCT Pub. No.: WO2011/062088
PCT Pub. Date: May 26, 2011

(65) Prior Publication Data
US 2012/0217814 A1  Aug. 30, 2012

(30) Foreign Application Priority Data
Nov. 20, 2009  (JP) ................................ 2009-265595

(51) Int. Cl.
*H02J 7/00* (2006.01)
*H02J 7/35* (2006.01)
*H01M 10/44* (2006.01)

(52) U.S. Cl.
CPC *H02J 7/35* (2013.01); *H01M 10/44* (2013.01); *Y02E 10/566* (2013.01)

(58) Field of Classification Search
CPC ......... H02J 7/35; H02J 7/0019; H01M 10/44; Y02T 90/127; B60L 2240/547; B60L 11/1855; B60L 2210/40

USPC .................. 320/128, 116, 124, 132, 118, 101
See application file for complete search history.

(56) References Cited

U.S. PATENT DOCUMENTS

| | | | |
|---|---|---|---|
| 6,373,226 B1 * | 4/2002 | Itou et al. | 320/132 |
| 2001/0038275 A1 * | 11/2001 | Hanada | 320/118 |
| 2004/0113585 A1 * | 6/2004 | Stanesti et al. | 320/116 |
| 2005/0162131 A1 * | 7/2005 | Sennami et al. | 320/128 |
| 2005/0168194 A1 * | 8/2005 | Stanesti et al. | 320/134 |
| 2009/0179495 A1 * | 7/2009 | Yeh | 307/66 |

FOREIGN PATENT DOCUMENTS

| | | |
|---|---|---|
| JP | 61-049325 | 10/1987 |
| JP | HEI 06-334208 | 12/1994 |
| JP | HEI 07-336910 | 12/1995 |
| JP | HEI 09-238427 | 9/1997 |
| JP | 2001-218365 | 8/2001 |
| JP | 2004-146791 | 5/2004 |

* cited by examiner

*Primary Examiner* — Brian Ngo
(74) *Attorney, Agent, or Firm* — Sheridan Ross P.C.

(57) ABSTRACT

Power generating elements output electromotive force. A path switching unit switches a path for connecting arbitrary power generating elements among the power generating elements. A voltage converting unit is a DC-DC converter that converts voltage levels of outputs of some of the power generating elements. A path switching control unit controls the path switching unit such that a set of power generating elements where a sum of maximum power point voltages falls within a range of an appropriate charging voltage of a storage element is connected to a short-circuit path and the other power generating elements are connected to a transformation path. A voltage conversion control unit controls a transformation rate of voltage conversion in the voltage converting unit such that a voltage in the transformation path and a voltage in the short-circuit path become equal to each other.

4 Claims, 26 Drawing Sheets

STORAGE CONTROL APPARATUS AND STORAGE CONTROL METHOD

CROSS REFERENCES TO RELATED APPLICATIONS

The present application is a national stage of International Application No. PCT/JP2010/069931 filed on Nov. 9, 2010 and claims priority to Japanese Patent Application No. 2009-265595 filed on Nov. 20, 2009, the disclosure of which is incorporated herein by reference.

BACKGROUND

The present invention relates to a storage control apparatus and a storage control method, and particularly to a storage control apparatus that charges a storage element using a power generating element and a processing method therefor.

Development of sources of clean energy that do not emit carbon dioxide and pollutants has been demanded as an environmental protection measure. Among them, solar power generation and wind power generation have increasingly proliferated in recent years. Particularly, solar power generating devices are being proliferated in general households, because of decreases in manufacturing costs of solar batteries (solar panels) disposed on roofs of houses and increases in power generation efficiency thereof. In addition, downsizing of solar batteries has advanced and mobile phones equipped therewith are now being sold.

Solar batteries have a property that is different from a property of a constant voltage source such as a dry cell. That is, the solar batteries have a property as a current source that depends on a voltage between terminals. For this reason, a voltage of a load connected to a solar battery needs to be matched with a maximum power point voltage of the solar battery to obtain a maximum output from the solar battery. In a current/voltage characteristic of the solar battery, there is only one maximum power point (MPP) at which power is maximized. However, because the current/voltage characteristic of the solar battery changes depending on an environment such as the illumination or the temperature, control to obtain the MPP voltage needs to be performed when a solar battery connection apparatus operates. The control to obtain the MPP when the apparatus operates is called maximum power point tracking (MPPT) control.

Various methods have been suggested as methods for executing the MPPT control. However, methods that are used in a direct-current path are roughly divided into two methods, i.e., a method of switching serial or parallel connection of a plurality of solar batteries (for example, refer to Patent Literature 1) and a method of controlling a switching-type DC-DC converter and obtaining an MPP (for example, refer to Patent Literature 2).

CITATION LIST

Patent Literature

Patent Literature 1: JP 2001-218365 (FIG. 1)
Patent Literature 2: JP 7-336910 (FIG. 1)

SUMMARY

According to the method of switching the serial or parallel connection of the plurality of solar batteries to execute the MPPT control, a control operation can be performed such that the voltage approaches the MPP. However, in this method, there is a limitation in that each solar battery needs to use the same MPP in order for the solar batteries to be connected in parallel. A serial or parallel connection type of the solar batteries changes according to the number of solar batteries. For example, when there are two solar batteries, the MPP is selected from the two MPPs of all series and all parallel. When there are six solar batteries, the MPP is selected from the four MPPs. Because a voltage difference between the points is not the same, a large number of voltage sections in which the voltage between the terminals is not matched with the MPP may occur.

According to the method of controlling the DC-DC converter and obtaining the MPP, a control signal that is input to a switch can be controlled to maximize a current charged in a storage battery. However, power loss occurs in the DC-DC converter or a control circuit such as a current measurement circuit.

The present invention has been made in view of the above circumstances and it is an object of the present invention to perform a control operation to maintain an MPP of a power generating element such as a solar battery and suppress power loss.

According to a first aspect of the present invention, in order to achieve the above-mentioned object, there is provided a storage control apparatus including a plurality of power generating elements that generate electromotive force, a path switching unit that performs path switching such that the plurality of power generating elements are divided into a plurality of groups and a path is formed for each group, a short-circuit path that supplies outputs of some groups among the plurality of groups to a storage element, a voltage converting unit that converts voltage levels of outputs other than those of the some groups among the plurality of groups, and a transformation path that supplies an output of the voltage converting unit to the storage element. Thereby, a control operation can be performed to maintain the maximum power points (MPP) of the power generating elements, by dividing the connection paths of the plurality of power generating elements into the transformation path passing the voltage converting unit and the short-circuit path not passing the voltage converting unit and supplying the output to the same storage element.

In the first aspect, the storage control apparatus may further include a path switching control unit that controls the path switching in the path switching unit and a voltage conversion control unit that controls a transformation rate of the voltage conversion in the voltage converting unit and the path switching control unit and the voltage conversion control unit may control a voltage of a side connected to the storage element, such that maximum power is obtained from the power generating elements in the transformation path. Thereby, a control operation can be performed to maintain the MPPs of the power generating elements and power loss can be suppressed. In this case, the storage control apparatus may further include a bypass switching unit that performs switching to bypass the voltage converting unit, when a difference of an input voltage of the voltage converting unit in the transformation path and a voltage of a side connected to the storage element in the short-circuit path is settled within a predetermined range, even when the voltage conversion is not performed. Thereby, power loss in the voltage converting unit can be suppressed.

According to a second aspect of the present invention, there is provided a storage control apparatus including a plurality of power generating elements that generate electromotive force, a path switching unit that performs path switching such that the plurality of power generating elements are divided into a plurality of groups and a path is formed for each group, a short-circuit path that supplies outputs of some groups among the plurality of groups to a first storage element, a voltage converting unit that converts voltage levels of outputs other than those of the some groups among the plurality of groups, and a transformation path that supplies an output of the voltage converting unit to a second storage element different from the first storage element. Thereby, a control operation can be performed to maintain the MPPs of the power generating elements, by dividing the connection paths of the plurality of power generating elements into the transformation path passing the voltage converting unit and the short-circuit path not passing the voltage converting unit and supplying the output to each storage element.

According to a third aspect of the present invention, there is provided a storage control apparatus including a plurality of power generating elements that generate electromotive force, a path switching unit that performs path switching such that the plurality of power generating elements are divided into a plurality of groups and a path is formed for each group, a connection switching unit that sorts the plurality of groups into groups needing conversion of a voltage level and groups not needing conversion of a voltage level and performs connection switching, a short-circuit path that supplies outputs of the groups not needing the conversion of the voltage level among the plurality of groups to a storage element, voltage converting units that convert voltage levels of outputs of the groups needing the conversion of the voltage levels among the plurality of groups, and transformation paths that supply an output of the voltage converting unit to the storage element. Thereby, an arbitrary combination of the paths can be realized when the connection paths of the plurality of power generating elements are divided into the transformation path passing the voltage converting units and the short-circuit path not passing the voltage converting units and the output is supplied to the same storage element. That is, the path switching unit and the connection switching unit may perform switching such that all of the plurality of power generating elements are connected in series to the short-circuit path and perform switching such that all of the plurality of power generating elements are connected in series to the transformation path. The path switching unit and the connection switching unit may perform switching such that all of the transformation paths are connected to one of the voltage converting units.

According to a fourth aspect of the present invention, there is provided a storage control method in a storage control apparatus which includes a plurality of power generating elements that generate electromotive force, a path switching unit that performs path switching such that the plurality of power generating elements are divided into a plurality of groups and a path is formed for each group, a short-circuit path that supplies outputs of the some groups among the plurality of groups to a storage element, a voltage converting unit that converts voltage levels of outputs other than those of the some groups among the plurality of groups, and a transformation path that supplies an output of the voltage converting unit to the storage element, the storage control method including an MPP voltage acquisition process of acquiring MPP voltages of the plurality of power generating elements, a group determination process of determining a set of the power generating elements where a sum of the MPP voltages falls within a range of an appropriate charging voltage of the storage element, among the plurality of power generating elements, as the some groups, and a connection process of connecting the power generating elements belonging to the some groups to the short-circuit path and connecting the other power generating elements to the voltage converting unit. Thereby, a control operation can be performed to maintain the MPPs of the power generating elements, by dividing the connection paths of the plurality of power generating elements into the transformation path passing the voltage converting unit and the short-circuit path not passing the voltage converting unit and performing charging in the range of the appropriate charging voltage of the storage element.

According to a fifth aspect of the present invention, there is provided a storage control method in a storage control apparatus which includes a plurality of power generating elements that generate electromotive force, a path switching unit that performs path switching such that the plurality of power generating elements are divided into a plurality of groups and a path is formed for each group, a short-circuit path that supplies outputs of some groups among the plurality of groups to a storage element, a voltage converting unit that converts voltage levels of outputs other than those of the some groups among the plurality of groups, and a transformation path that supplies an output of the voltage converting unit to the storage element, the storage control method including a storage starting process of starting storage of the storage element, when a voltage by serial connection of the plurality of power generating elements reaches an operation voltage of the storage element, a parallel switching process of performing the path switching such that parallelism of the plurality of power generating elements becomes high under an environment where the illumination is high, a serial switching process of performing the path switching such that the number of series of the plurality of power generating elements increases under an environment where the illumination is low, and a storage stopping process of stopping the storage of the storage element, when the voltage by the serial connection of the plurality of power generating elements does not reach the operation voltage of the storage element. Thereby, a control operation can be performed to maintain the MPPs of the power generating elements, by dividing the connection paths of the plurality of power generating elements into the transformation path passing the voltage converting unit and the short-circuit path not passing the voltage converting unit and switching the path according to the illumination.

According to the present invention, a superior effect of performing a control operation to maintain a maximum power point of a power generating element such as a solar battery and suppressing power loss can be achieved.

Additional features and advantages are described herein, and will be apparent from the following Detailed Description and the figures.

DETAILED DESCRIPTION

Hereinafter, embodiments to carry out the present invention will be described. The description is given in the following order.

Figure 1:
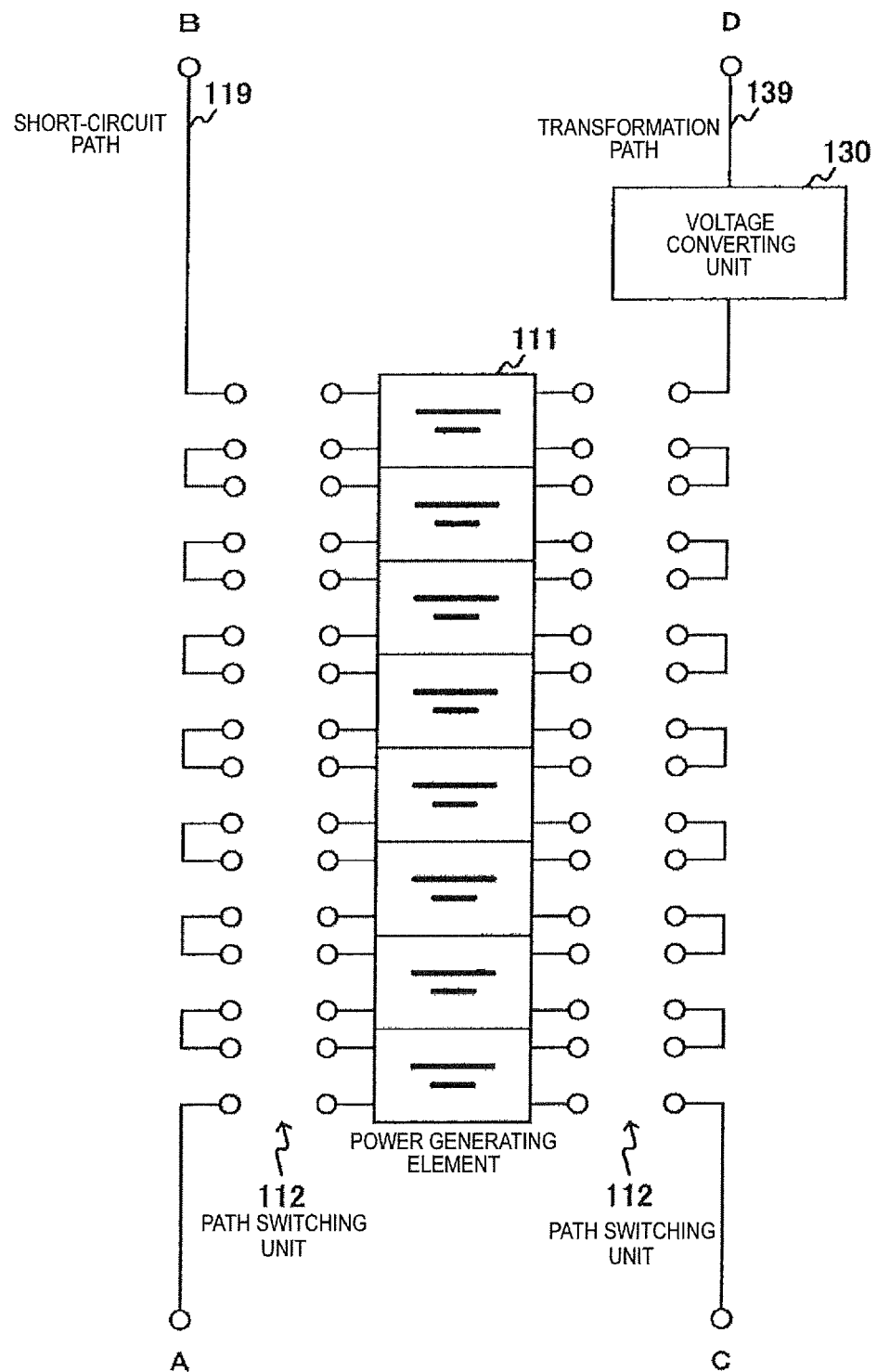
FIG. 1 is an illustration of an example of a basic structure of a storage control apparatus according to an embodiment of the present invention.

1. Operation principle
2. First embodiment (example of path switching control and voltage conversion control)
3. Second embodiment (example using a power generation switching element of two inputs and two outputs)
4. Third embodiment (example of facilitated voltage conversion control)
5. Fourth embodiment (example of control based on station transition according to output voltage of power generating element)
6. Fifth embodiment (example using power generation switching element of four inputs and four outputs)
7. Sixth embodiment (example using a plurality of short-circuit paths)
8. Seventh embodiment (example using a plurality of transformation paths)
9. Modification 1. Operation Principle FIG. 1 is an illustration of an example of a basic structure of a storage control apparatus according to an embodiment of the present invention. In the structure example, the storage control apparatus includes a plurality of power generating elements 111, path switching units 112, a short-circuit path 119, a voltage converting unit 130, and a transformation path 139.

The power generating element 111 is an element that outputs electromotive force. For example, the power generating element 111 is realized by a solar battery generating electromotive force from sunlight or a wind power generating device generating electromotive force from wind. The path switching unit 112 is a switch that switches a path for connecting the arbitrary power generating elements 111 among the plurality of power generating elements 111. By changing the connection in the path switching unit 112, the path to which each of the power generating elements 111 is connected can be switched.

The voltage converting unit 130 is a DC-DC converter that converts a voltage level of an output of the power generating element 111. The voltage converting unit 130 and the power generating element 111 are connected by the path switching unit 112.

The transformation path 139 is a path between a terminal C and a terminal D. The voltage converting unit 130 is connected to the transformation path 139, the voltage level of the output of the power generating element 111 is converted, and the converted voltage is supplied to the terminal D. The short-circuit path 119 is a path between a terminal A and a terminal B. The voltage converting unit 130 is not connected to the short-circuit path 119 and the output of the power generating element 111 is directly supplied to the terminal B. Elements other than the voltage converting unit 130 such as a resistor or a diode may be inserted into an output side of the short-circuit path 119. This is particularly effective when an output voltage of the power generating element 111 becomes low and a current flows adversely from a storage element to the side of the power generating element.

Figure 2:
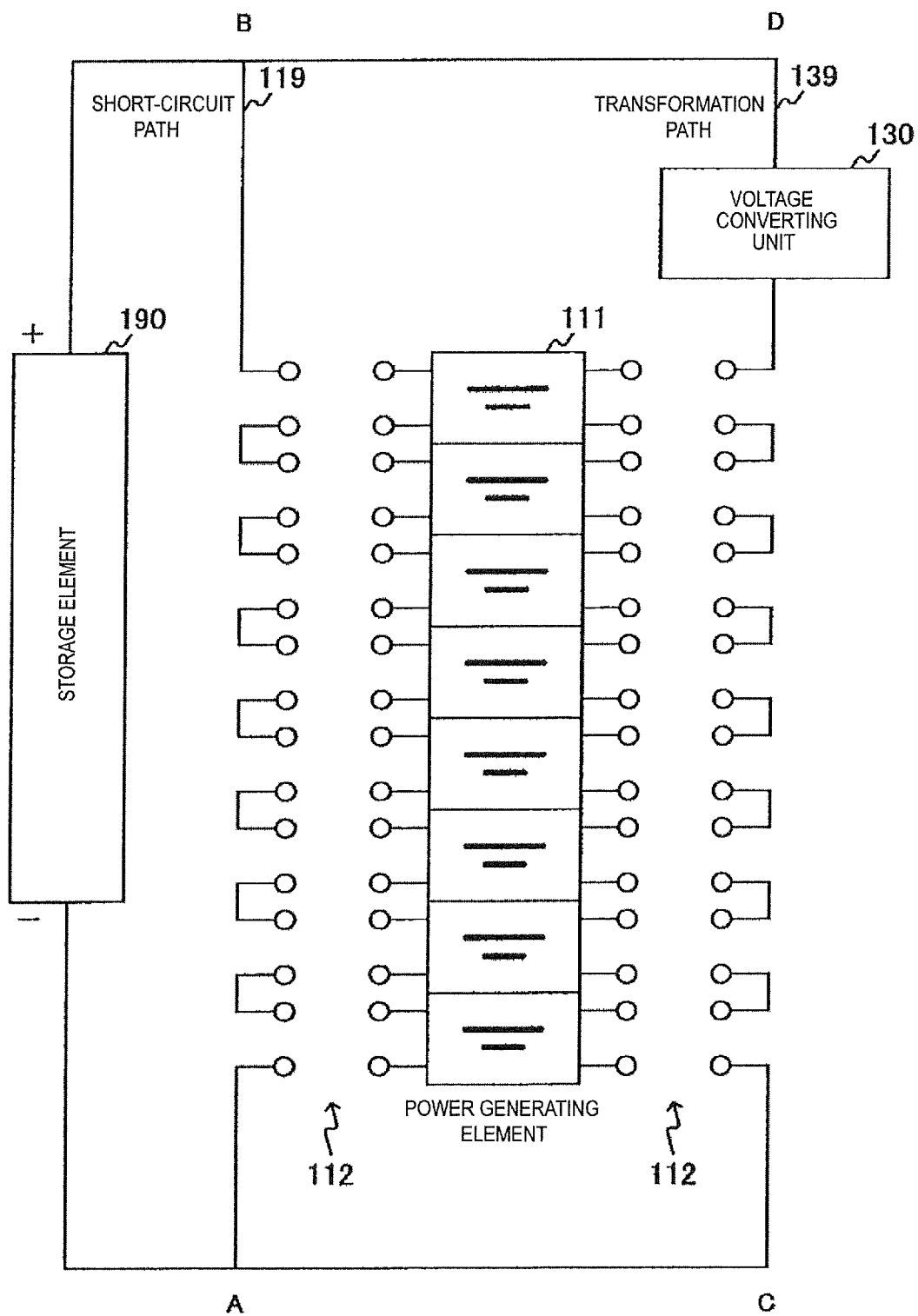
FIG. 2 is an illustration of an example of connection between the storage control apparatus and a storage element according to the embodiment of the present invention.

FIG. 2 is an illustration of an example of connection between the storage control apparatus and a storage element according to the embodiment of the present invention. In this example, the short-circuit path 119 and the transformation path 139 are connected in parallel and are connected to the same storage element 190. That is, the terminals B and D are connected to a positive side of the storage element 190 and the terminals A and C are connected to a negative side of the storage element 190. Thereby, the output of the power generating element 111 on the short-circuit path 119 is supplied to the storage element 190 and the output of the power generating element 111 on the transformation path 139 is supplied to the storage element 190 after the voltage level thereof is converted by the voltage converting unit 130.

Figure 3:
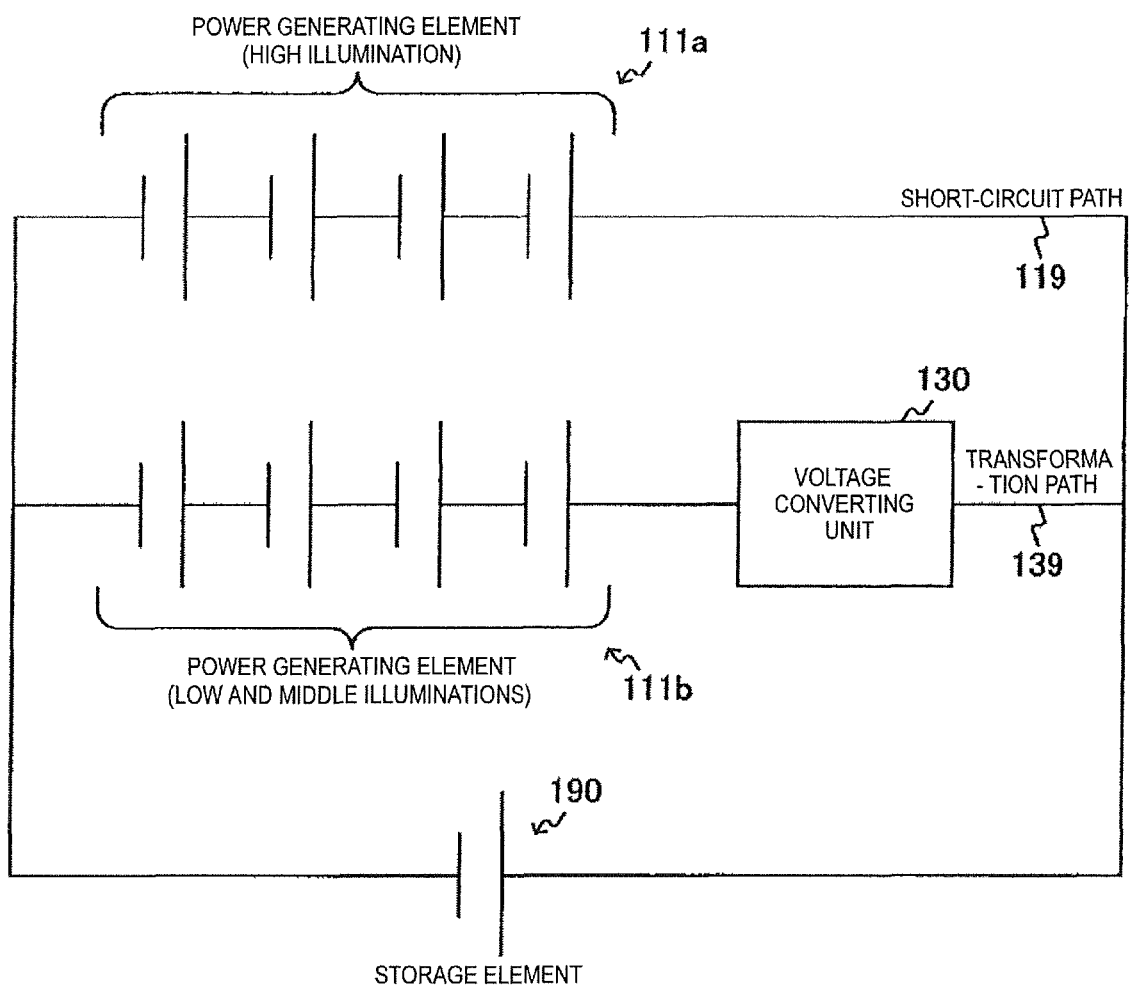
FIG. 3 is an illustration of an example of a circuit where the storage control apparatus and the storage element according to the embodiment of the present invention are connected.

FIG. 3 is an illustration of an example of a circuit where the storage control apparatus and the storage element according to the embodiment of the present invention are connected. The illustration of the circuit is obtained by dividing the power generating elements into a group of power generating elements 111*a* with the high illumination and a group of power generating elements 111*b* with the low and middle illuminations by switching the path by the path switching unit 112, connecting the former to the short-circuit path 119, and connecting the latter to the transformation path 139 in the connection example of FIG. 2. As such, the path switching unit 112 can switch the path such that the arbitrary power generating elements 111 among the plurality of power generating elements 111 are connected to the short-circuit path 119 or the transformation path 139.

Figure 4:
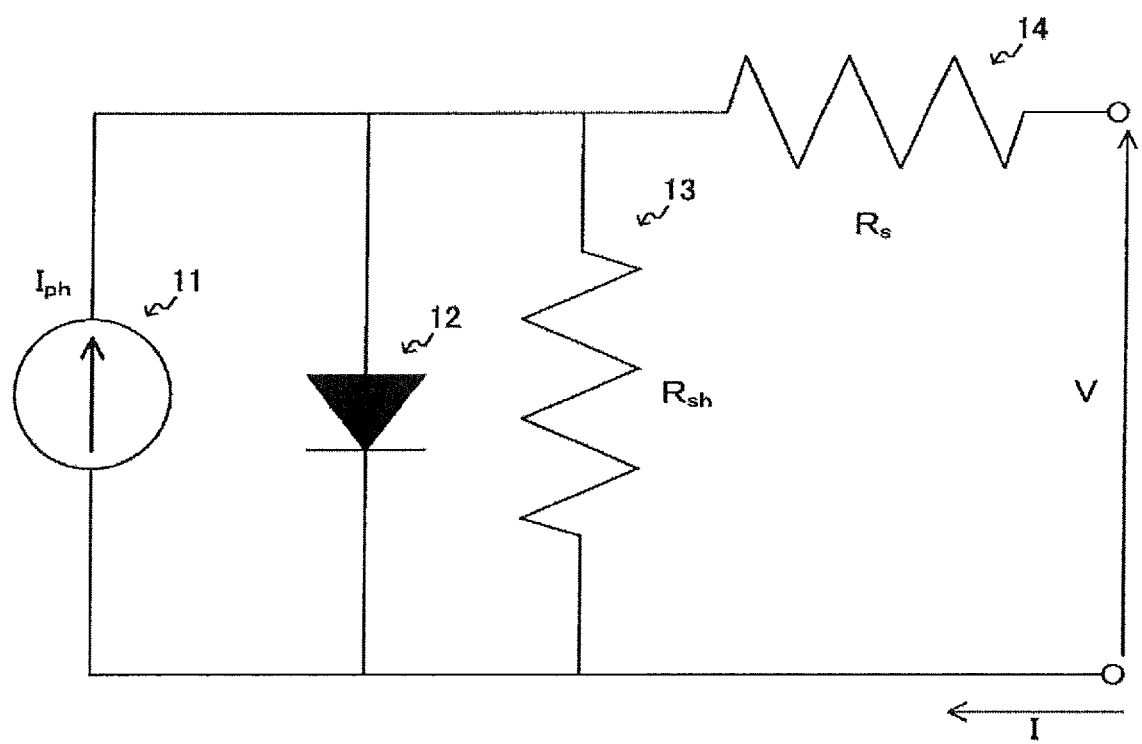
FIG. 4 is an illustration of an equivalent circuit of a general solar battery.

FIG. 4 is an illustration of an equivalent circuit of a general solar battery. The equivalent circuit has a structure in which a current source 11, a diode 12, and a resistor 13 are connected in parallel and a resistor 14 is connected in series thereto. The current source 11 supplies a photocurrent Iph. The diode 12 is an ideal diode. The resistor 13 is a shunt resistor Rsh. The resistor 14 is a serial resistor Rs. If a voltage V between terminals of the solar battery increases, the current I that flows to the terminal side decreases according to an increase in the voltage V, because the current Iph flows from the current source 11 to the diode 12.

Figure 5:
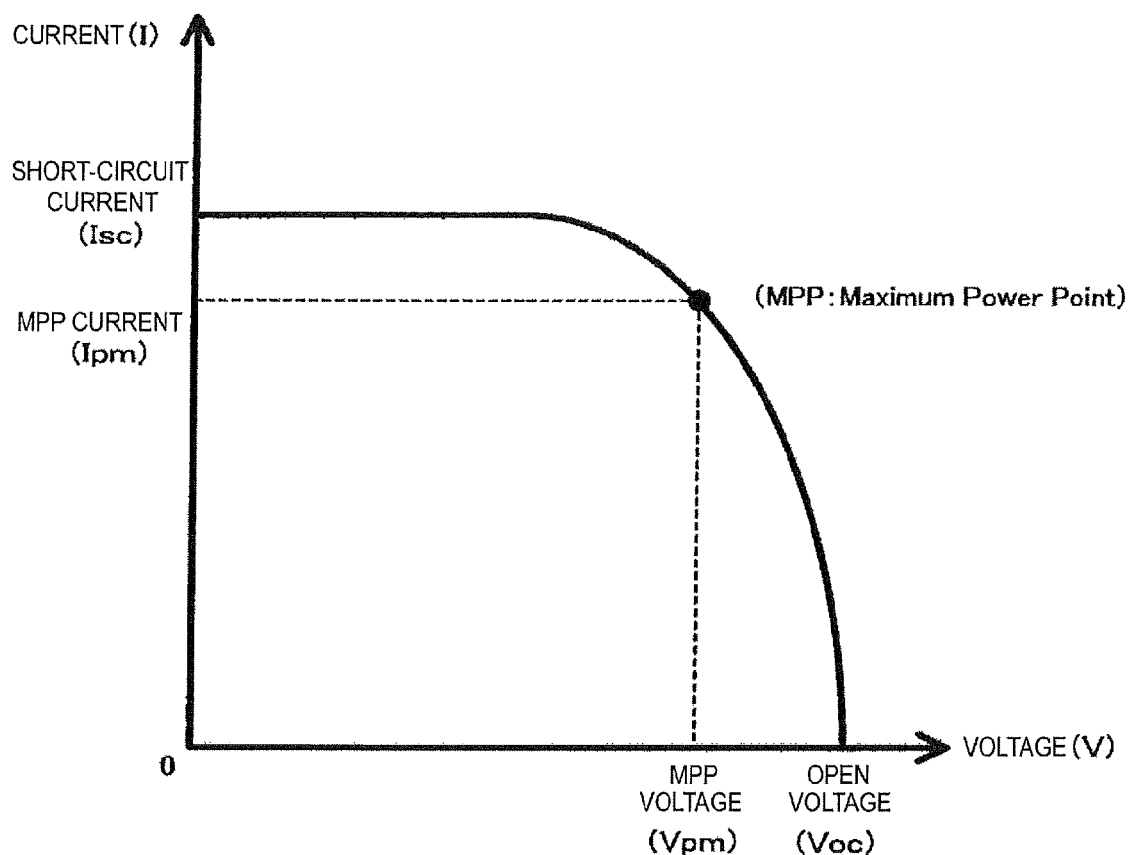
FIG. 5 is an illustration of a current/voltage characteristic of the general solar battery.

FIG. 5 is an illustration of a current/voltage characteristic of the general solar battery. If a voltage value between the terminals of the solar battery is determined, an output current value is uniquely determined. The voltage between the terminals when the current value is 0 is called an open voltage (Voc) and the output current value when the voltage value between the terminals is 0 is called a short-circuit current (Isc). As described above, in a curve of a current/voltage characteristic of the solar battery, there is one maximum power point (MPP) at which power (voltage×voltage) is maximized. A current at the MPP is called an MPP current (Ipm) and a voltage at the MPP is called an MPP voltage (Vpm).

In order to obtain a maximum output from the solar battery, a voltage of a load connected to the solar battery needs to be matched with the MPP voltage of the solar battery, due to a characteristic of the solar battery. Because the current/voltage characteristic of the solar battery changes depending on an environment such as the illumination and the temperature, control to obtain the MPP voltage needs to be performed when a solar battery connection apparatus operates. Therefore, in the embodiment of the present invention, the MPP voltage of each power generating element 111 is acquired, the path is switched such that the power generating element 111 is connected to the short-circuit path 119 or the transformation path 139, and the voltage level is converted by the voltage converting unit 130 according to the output voltage.

In the embodiment of the present invention, first, a control operation is performed such that the power generating elements 111 are connected to the short-circuit path 119 and the remaining power generating elements 111 are connected to the transformation path 139, to make the designated output voltage become the MPP voltage. Thereby, an output of high efficiency can always be obtained with respect to the change in the designated output voltage, such as connection with the storage element 190 of which the charging voltage changes.

In the embodiment of the present invention, if a switching interval of the switch of the voltage converting unit 130 is controlled with respect to the power generating element 111 on the transformation path 139, an output of high efficiency can be obtained with respect to the power generating element 111 of which an output depends on the voltage between the terminals of the solar battery.

In the embodiment of the present invention, the output path of the solar battery can be divided into the short-circuit path 119 and the transformation path 139 or all of the power generating elements 111 can be connected to the short-circuit path 119 without passing the voltage converting unit 130. By this structure, power loss by the voltage converting unit 130 can be minimized.

In the embodiment of the present invention, a control operation can be performed such that the power generating elements 111 having the different output voltages or output currents are connected to the different paths. Thereby, a maximum output can be obtained with respect to the power generating elements 111 on all of the paths. For example, a plurality of solar batteries to be partially shaded or a plurality of solar batteries arranged at positions having different plane angles can be connected and an output of high efficiency can be output.

In the embodiment of the present invention, for example, when the power generating element 111 is the solar battery, the path of the solar battery and the arrangement of the voltage converting unit 130 can be switched when the illumination is high (an output is large) and when the illumination is low (an output is small), respectively. Thereby, power of high efficiency can be obtained without depending on the magnitude of the illumination.

2. First Embodiment

Example of a Structure of the Storage Control Apparatus

Figure 6:
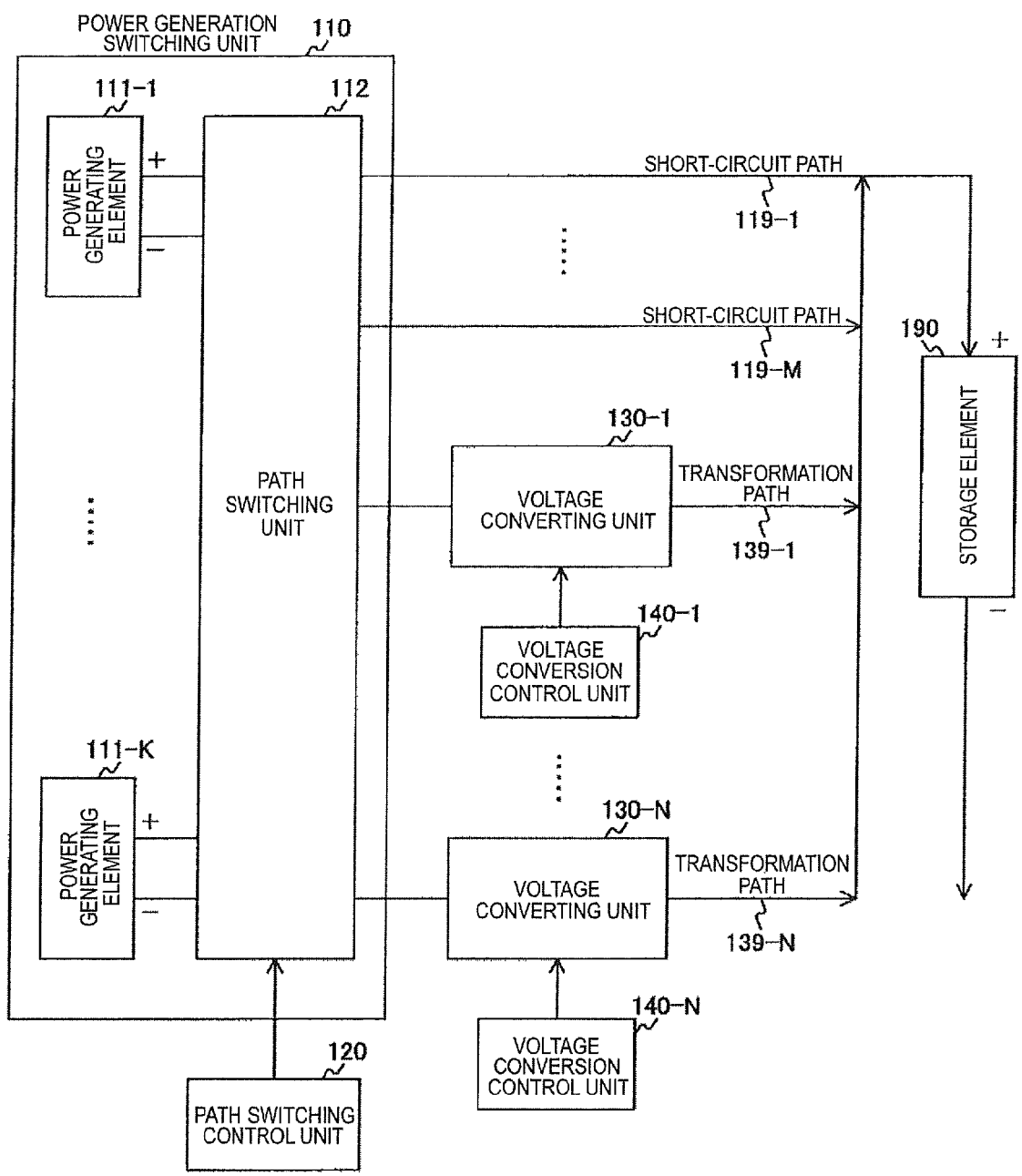
FIG. 6 is an illustration of an example of a structure of a storage control apparatus according to a first embodiment of the present invention.

FIG. 6 is an illustration of an example of a structure of a storage control apparatus according to a first embodiment of the present invention. The storage control apparatus includes a power generation switching unit 110, a path switching control unit 120, N voltage converting units 130-1 to 130-N, and N voltage conversion control units 140-1 to 140-N and controls storage with respect to a storage element 190.

The power generation switching unit 110 includes K power generating elements 111-1 to 111-K and a path switching unit 112. The power generation switching unit 110 switches a connection path of the power generating elements 111-1 to 111-K and outputs electromotive force from the power generating elements 111-1 to 111-K. The power generating elements 111-1 to 111-K are elements that output electromotive force and may be generally called the power generating elements 111 as described above. The path switching unit 112 is a switch that switches the path for connecting the arbitrary power generating elements among the K power generating elements 111-1 to 111-K, as described above.

The path switching control unit 120 controls switching of the path by the path switching unit 112. Specific contents of the control of the switching of the path by the path switching control unit 120 will be described below with reference to the drawings.

The voltage converting units 130-1 to 130-N are DC-DC converters that convert voltage levels of outputs of a part of the power generating elements 111-1 to 111-K and may be generally called the voltage converting units 130 as described above. The voltage conversion control units 140-1 to 140-N correspond to the voltage converting units 130-1 to 130-N, respectively, and control a transformation rate of voltage conversion in the corresponding voltage converting units 130. The voltage conversion control units 140-1 to 140-N may be generally called the voltage conversion control units 140.

The storage element 190 is an element that charges the supplied power. For example, the storage element 190 may be an element such as an electric double layer capacitor or a lithium-ion secondary battery, in which the charging voltage changes.

In this example, (M+N) paths that include M short-circuit paths 119-1 to 119-M and N transformation paths 139-1 to 139-N are assumed as outputs of the path switching unit 112. The voltage converting units 130-1 to 130-N are connected to the transformation paths 139-1 to 139-N, the voltage level of the output of the power generating element 111 is converted, and the converted voltage is supplied to the storage element 190. The voltage converting unit 130 is not connected to the short-circuit paths 119-1 to 119-M and the output of the power generating element 111 is supplied to the storage element 190. At this time, the path switching control unit 120 and the voltage conversion control unit 140 perform a control operation such that a voltage in the transformation paths 139-1 to 139-N and a voltage in the short-circuit paths 119-1 to 119-M become equal to each other. As described above, the short-circuit paths 119-1 to 119-M may be generally called the short-circuit paths 119 and the transformation paths 139-1 to 131-N may be generally called the transformation paths 139. The path switching control unit 120 and the voltage conversion control unit 140 control a voltage of a side connected to the power generating elements 111, such that the maximum power is obtained from the power generating elements 111 on the transformation path 139 by the method described in Patent Literature 2 or a method such as a voltage regulation method and a hill climbing method.

[Example of an Operation of the Storage Control Apparatus]

Figure 7:
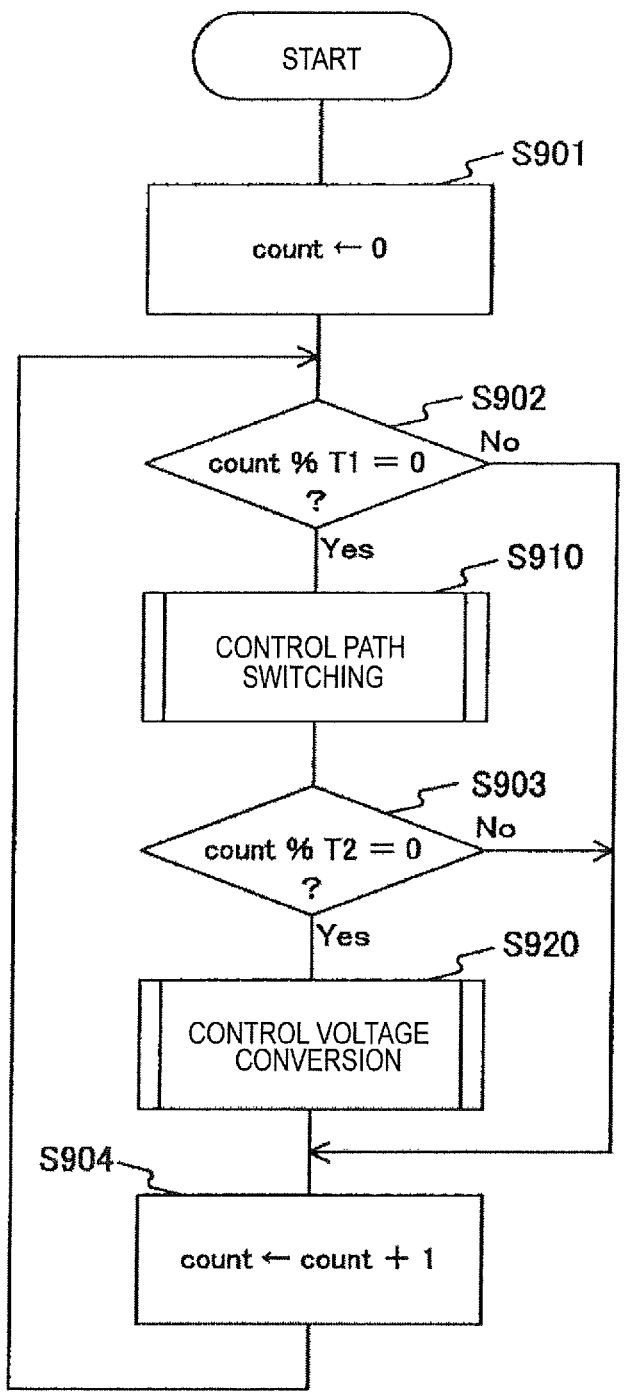
FIG. 7 is an illustration of an example of a process sequence of the storage control apparatus according to the first embodiment of the present invention.

FIG. 7 is an illustration of an example of a process sequence of the storage control apparatus according to the first embodiment of the present invention. In this case, a counter output count is assumed and the counter output count is first initialized to "0" (step S901). When the counter output count is added one by one (step S904), the path switching control and the voltage conversion control are performed at a constant time interval. That is, when a value of the counter output count is the multiple of a predetermined value T1 (step S902), the path switching control (step S910) is executed and when the value of the counter output count is the multiple of a predetermined value T2 (step S903), the voltage conversion control (step S920) is executed.

Figure 8:
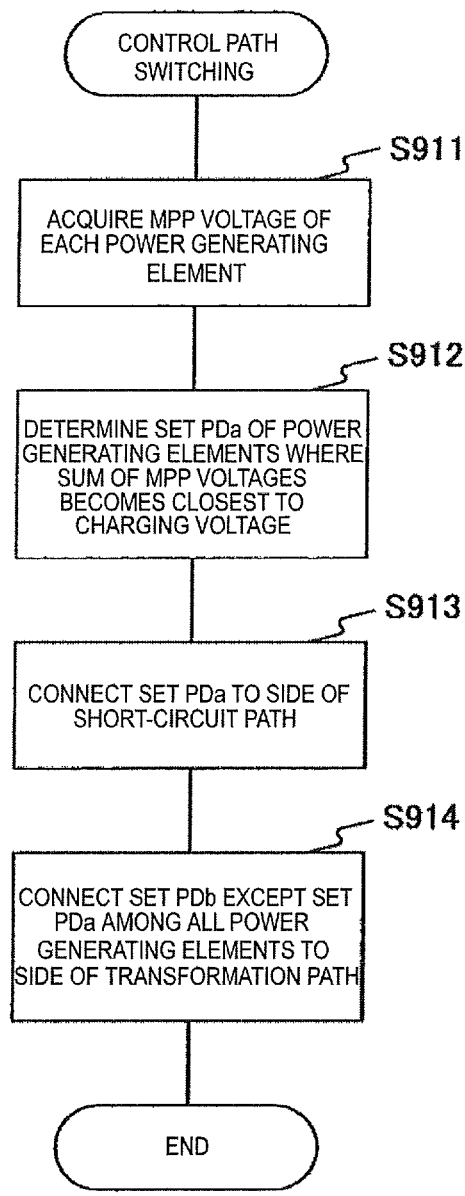
FIG. 8 is an illustration of an example of a process sequence of path switching control (step S910) in the first embodiment of the present invention.

FIG. 8 is an illustration of an example of a process sequence of path switching control (step S910) in the first embodiment of the present invention.

First, the MPP voltage of each power generating element 111 is acquired (step S911). As a method of acquiring the MPP voltage, a method such as the voltage regulation method of obtaining a voltage similar to the MPP voltage by multiplying the opening voltage of the power generating element with a constant value is known. When the voltage regulation method is used, all open voltages of the power generating elements 111-1 to 111-K need to be measured. However, when all of the outputs of the power generating elements 111-1 to 111-K are the same, that is, characteristics, cell numbers, and environments of all of the power generating elements are the same, if the open voltage of any power generating element is measured, the MPP voltage can be calculated by multiplying the open voltage by a constant value. Step S911 is an example of an MPP voltage acquisition process described in the claims.

Next, a set PDa of power generating elements 111 where a sum of the MPP voltages becomes most similar to an appropriate charging voltage of the storage element 190 is determined among the power generating elements 111-1 to 111-K (step S912). The set PDa can be realized by a list of identification numbers of the power generating elements 111. The power generating elements 111 that belong to the set PDa determined in the above-described manner are connected to the side of the short-circuit path 119 (step S913). A set PDb of power generating elements 111 other than the power generating elements 111 belonging to the set PDa are determined among the power generating elements 111-1 to 111-K and the power generating elements 111 belonging to the set PDb are connected to the side of the transformation path 139 (step S914). Step S912 is an example of a group determination process described in the claims. Steps S913 and S914 are an example of a connection process described in the claims.

Figure 9:
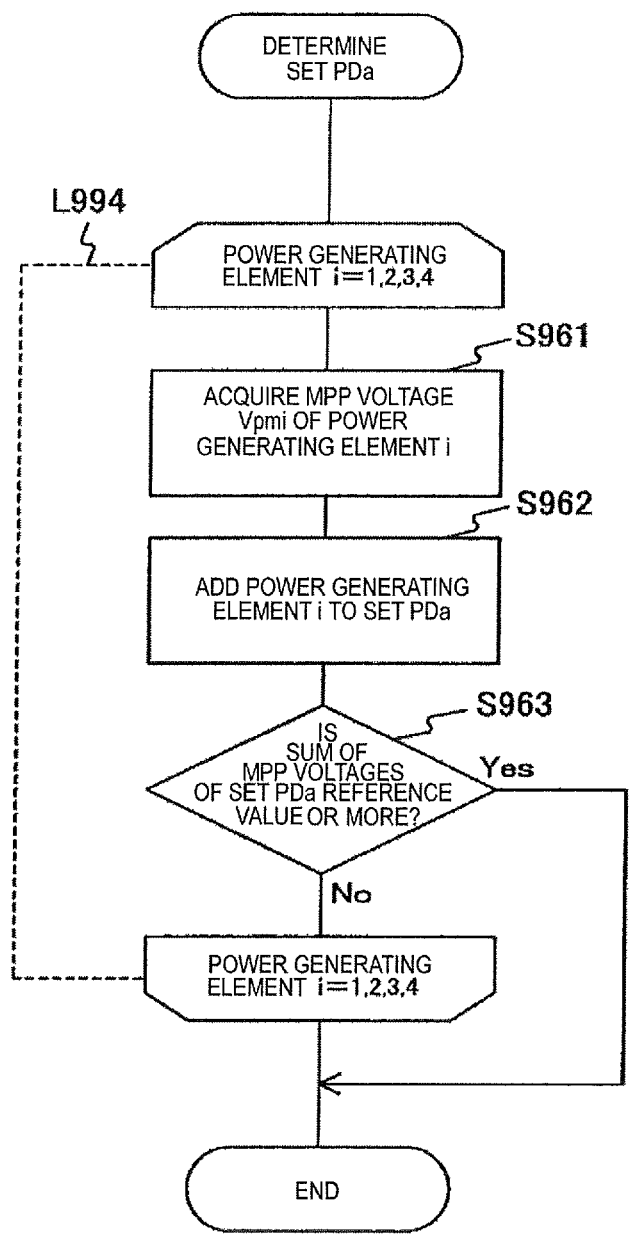
FIG. 9 is an illustration of an example of a detailed process sequence of determination of a set PDa in the first embodiment of the present invention.

FIG. 9 is an illustration of an example of a detailed process sequence of determination of the set PDa in the first embodiment of the present invention. This process corresponds to steps S911 and S912 in FIG. 8 described above. As one example, the case in which K is 4, that is, the number of power generating elements 111 is four, will be described.

In a loop L994, the following process is executed with respect to each of the power generating elements 111-1 to 111-4. First, an MPP voltage Vpm1 of the power generating element 111-1 is acquired (step S961). The power generating element 111-1 is added as an element of the set PDa (step S962). At this time, if the sum of the MPP voltages of the power generating elements 111 belonging to the set PDa is a predetermined reference value or more, the process ends and the set PDa is determined (step S961). Meanwhile, if the sum of the MPP voltages of the power generating elements 111 belonging to the set PDa is less than the predetermined reference value, an MPP voltage Vpm2 of the next power generating element 111-2 is acquired (step S961) and the process in the loop 994 is repeated. Step S961 is an example of an MPP voltage acquisition process described in the claims. Step S962 is an example of a group determination process described in the claims.

Thereby, when the MPP voltage of each power generating element 111 is 1 V and the charging voltage of the storage element 190 is 3 V, the three power generating elements 111 are connected to the short-circuit path 119 and one power generating element 111 is connected to the transformation path 139.

Figure 10:
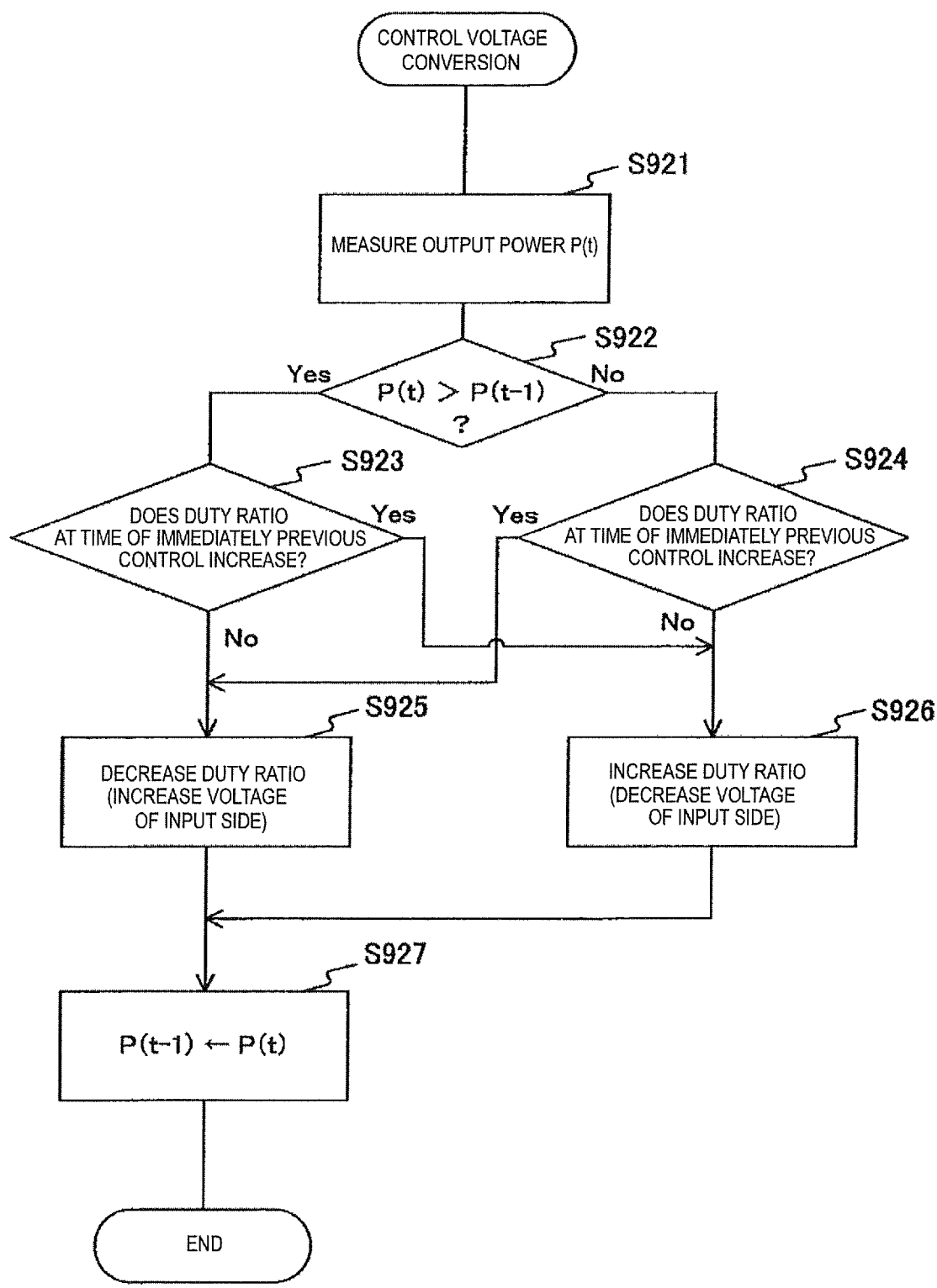
FIG. 10 is an illustration of an example of a process sequence of voltage conversion control (step S920) in the first embodiment of the present invention.

FIG. 10 is an illustration of an example of a process sequence of voltage conversion control (step S920) in the first embodiment of the present invention. A method of controlling the output voltage of the power generating element of the input side of the DC-DC converter by controlling a duty ratio or a frequency of the DC-DC converter when the storage element having a small load is connected to the output side of the DC-DC converter is known. In this case, an example of converter control based on the duty ratio will be described.

In the voltage conversion control unit 140, output power P(t) that is supplied to the storage element 190 is measured by regularly executing duty ratio control (step S921). As the result of an immediately previous duty ratio operation, when the output power increases (step S922: Yes), the same duty ratio operation is executed again. That is, when the duty ratio at the time of the immediately previous control increases (step S923: Yes), the duty ratio is increased and the voltage of the input side is decreased (step S926). Meanwhile, when the duty ratio at the time of the immediately previous control decreases (step S923: No), the duty ratio is decreased and the voltage of the input side is increased (step S925).

Meanwhile, as the result of the immediately previous duty ratio operation, when the output power decreases (step S922: No), a different duty ratio operation is executed again. That is, when the duty ratio at the time of the immediately previous control increases (step S924: Yes), the duty ratio is decreased and the voltage of the input side is increased (step S926). Meanwhile, when the duty ratio at the time of the immediately previous control decreases (step S924: No), the duty ratio is increased and the voltage of the input side is increased (step S925).

Finally, the current output power P(t) is held as the immediately previous output power P (t−1) for a next process (step S927).

As such, according to the first embodiment of the present invention, the power generating elements 111 can be connected to the short-circuit path 119 such that the designated output voltage becomes the MPP voltage and the output levels of the remaining power generating elements 111 can be converted by the voltage converting unit 130. That is, the power generating elements 111 can be connected such that the voltage falls within a range of an appropriate charging voltage of the storage element 190.

3. Second Embodiment

Example of a Structure of a Storage Control Apparatus

Figure 11:
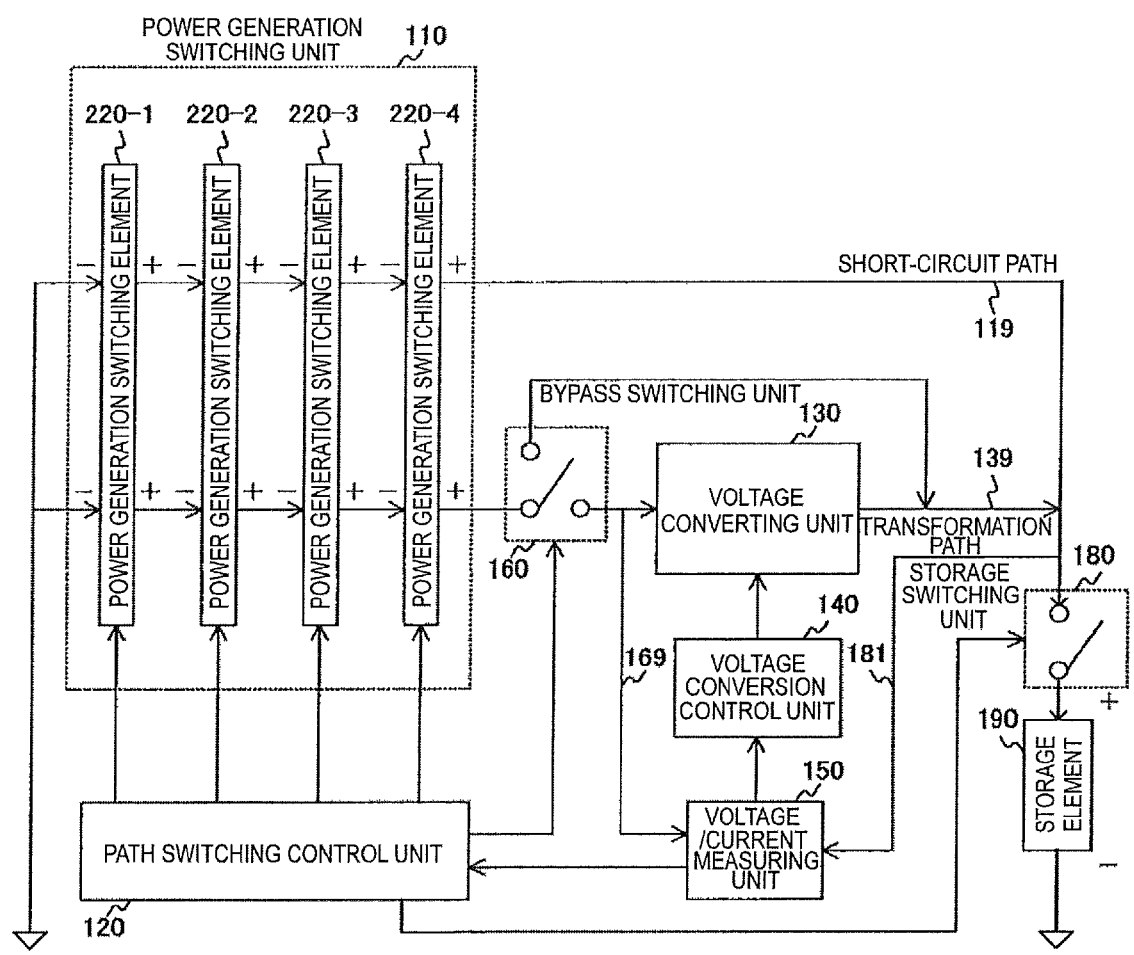
FIG. 11 is an illustration of an example of a structure of a storage control apparatus according to a second embodiment of the present invention.

FIG. 11 is an illustration of an example of a structure of a storage control apparatus according to a second embodiment of the present invention. The storage control apparatus includes a power generation switching unit 110, a path switching control unit 120, a voltage converting unit 130, a voltage conversion control unit 140, a voltage/current measuring unit 150, a bypass switching unit 160, and a storage switching unit 180 and controls storage with respect to the storage element 190. In the structure example, it is assumed that one short-circuit path 119 and one transformation path 139 are provided. Because the path switching control unit 120, the voltage converting unit 130, and the voltage conversion control unit 140 have the same functions as those of the first embodiment, the description thereof is omitted herein.

In this example, the power generation switching unit 110 includes four power generation switching elements 220-1 to 220-4. Each of the power generation switching elements 220-1 to 220-4 includes a power generating element 111 and a path switching unit 112. An example of a structure of each of the power generation switching elements 220-1 to 220-4 will be described below with reference to the drawings. The power generation switching elements 220-1 to 220-4 may be generally called the power generation switching elements 220.

The bypass switching unit 160 is a switch that switches whether the voltage converting unit 130 is bypassed according to the control of the path switching control unit 120. When a difference of an input voltage of the voltage converting unit 130 in the transformation path 139 and a voltage of a side connected to the storage element 190 in the short-circuit path 119 falls within a predetermined range, even when the voltage conversion is not performed, the path switching control unit 120 performs a control operation to bypass the voltage converting unit 130. Thereby, the path switching control unit 120 stops the conversion of the voltage by the voltage converting unit 130. In this case, the predetermined range means a range of a difference of a voltage in which power loss according to an interval from the MPP in the voltage converting unit 130 becomes less than or equal to power loss by the voltage converting unit 130 when the voltage converting unit is not bypassed. For example, a range of 10 to 20 percent above and below the voltage of the side connected to the storage element 190 can be assumed. When all of the outputs of the power generating elements 111 are the same and the number of power generating elements on the short-circuit path 119 is equal to the number of power generating elements on the transformation path 139, it may be determined that the voltage in the transformation path 139 and the voltage in the short-circuit path 119 are equal to each other and the voltage converting unit 130 may be bypassed. Thereby, power loss in the voltage converting unit 130 can be suppressed.

The voltage/current measuring unit 150 measures a voltage or a current that is output from the short-circuit path 119 and the transformation path 139.

The storage switching unit 180 is a switch that switches whether the outputs from the short-circuit path 119 and the transformation path 139 are supplied to the storage element 190, according to the control of the path switching control unit 120. When the open voltage of the power generating element is measured by the voltage/current measuring unit 150, the path switching control unit 120 turns off the storage switching unit 180 and opens a circuit.

Figure 12:
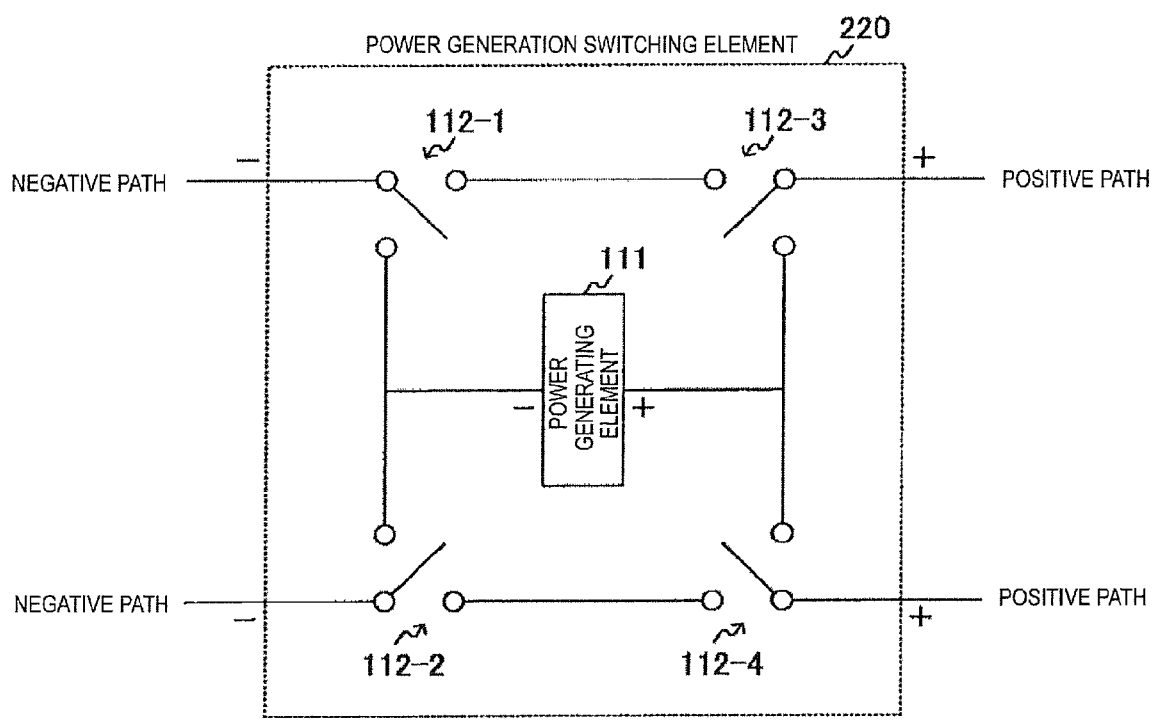
FIG. 12 is an illustration of a first example of a structure of a power generation switching element 220 in the second embodiment of the present invention.

FIG. 12 is an illustration of a first example of a structure of the power generation switching element 220 in the second embodiment of the present invention. In the first structure example, the power generation switching element 220 includes one power generating element 111 and four path switching units 112-1 to 112-4.

The path switching units 112-1 and 112-2 are switches that switch whether a negative terminal of the power generating element 111 is connected to either of two negative paths of the power generation switching element 220. The path switching units 112-3 and 112-4 are switches that switch whether a negative terminal of the power generating element 111 is connected to either of two positive paths of the power generation switching element 220. Thereby, the power generating elements 111 can be connected to any combination of the two negative paths and the two positive paths of the power generation switching element 220. The switching control of the path switching units 112-1 to 112-4 is executed by the path switching control unit 120.

Figure 13:
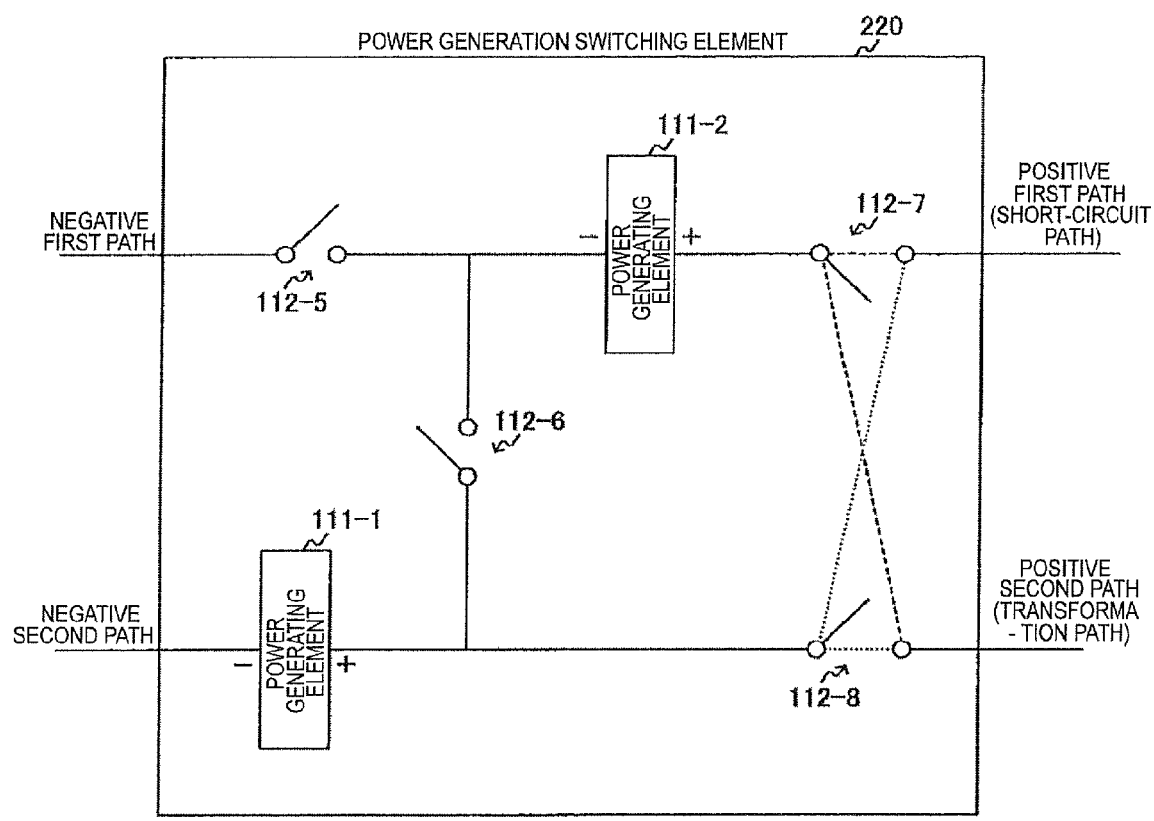
FIG. 13 is an illustration of a second example of the structure of the power generation switching element 220 in the second embodiment of the present invention.

FIG. 13 is an illustration of a second example of the structure of the power generation switching element 220 in the second embodiment of the present invention. In the second structure example, the power generation switching element 220 includes the two power generating elements 111-1 and 111-2 and the four path switching units 112-5 to 112-8. In the second structure example, the power generation switching element 220 includes the two negative paths and the two positive paths, similar to the first structure example. However, the second structure example is different from the first structure example in that two power generating elements 111-1 and 111-2 are provided inside. That is, as compared with the first structure example, a ratio of the path switching unit 112 with respect to the power generating element 111 can be decreased.

In the second structure example, the power generating elements 111-1 and 111-2 that are connected in series can be connected to any combination of the two negative paths and the two positive paths of the power generation switching element 220. The power generating elements 111-1 and 111-2 can be connected in parallel and can be connected to each combination of the negative paths and the positive paths. Similar to the first structure example, the switching control of the path switching units 112-5 to 112-8 is executed by the path switching control unit 120.

Figure 14:
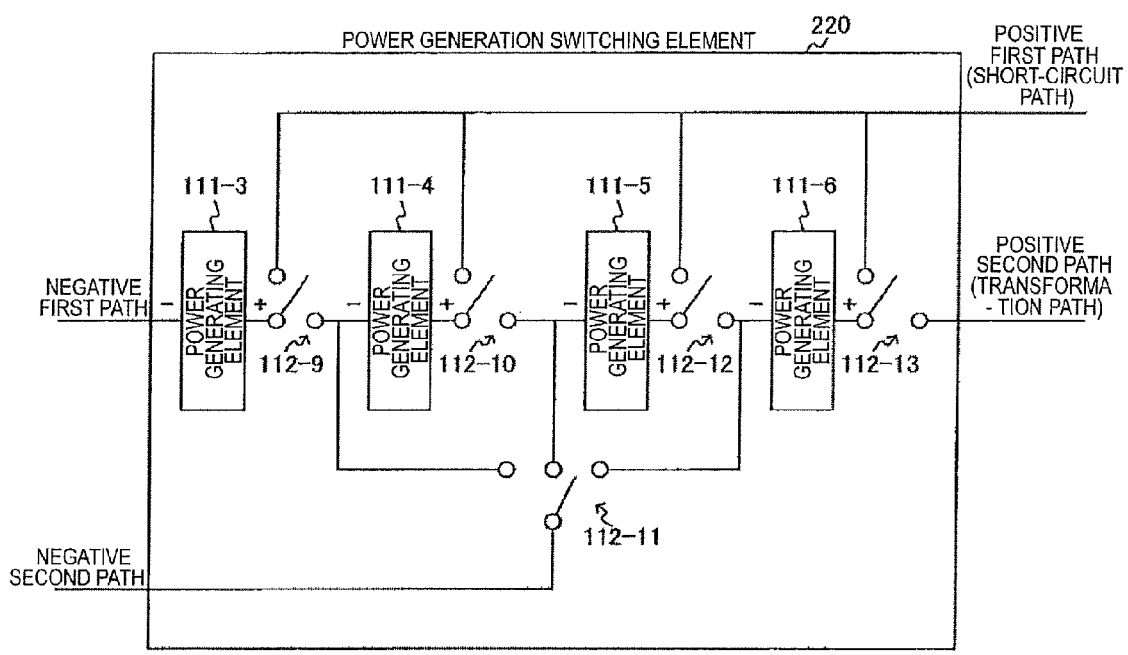
FIG. 14 is an illustration of a third example of the structure of the power generation switching element 220 in the second embodiment of the present invention.

FIG. 14 is an illustration of a third example of the structure of the power generation switching element 220 in the second embodiment of the present invention. In the third structure example, the power generation switching element 220 includes four power generating elements 111-3 to 111-6 and five path switching units 112-9 to 112-13. In the third structure example, the power generation switching element 220 includes two negative paths and two positive paths, similar to the first structure example. However, the third structure example is different from the first structure example in that the four power generating elements 111-3 to 111-6 are provided inside. That is, as compared with the second structure example, a ratio of the path switching unit 112 with respect to the power generating element 111 can be further decreased. However, a degree of freedom of path setting becomes low as follows.

In the third structure example, at least one of the power generating elements 111-3 to 111-6 can be connected to a first path (side of a short-circuit path 119) and each combination of the power generating elements 111-3 to 111-6 can be connected in series. In addition, at least one of the power generating elements 111-4 to 111-6 can be connected to a second path (side of a transformation path 139) and each combination of the power generating elements 111-4 to 111-6 can be connected in series.

As such, according to the second embodiment of the present invention, the power generating elements 111 can be divided into the power generation switching elements 220 and the path switching can be flexibly performed. The voltage converting unit 130 can be bypassed in the transformation path 139 and power loss in the voltage converting unit 130 can be suppressed.

4. Third Embodiment

Example of a Structure of a Storage Control Apparatus

Figure 15:
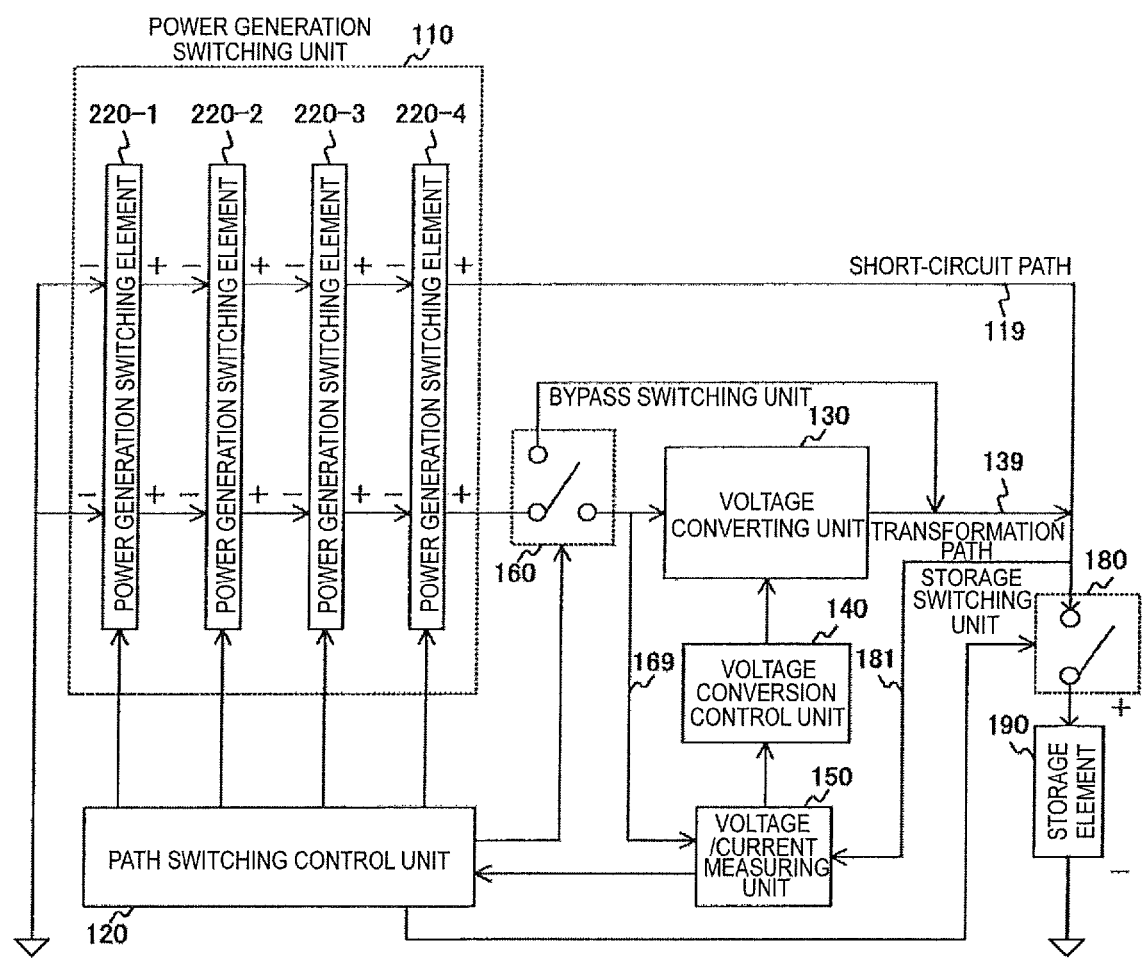
FIG. 15 is an illustration of an example of a structure of a storage control apparatus according to a third embodiment of the present invention.

FIG. 15 is an illustration of an example of a structure of a storage control apparatus according to a third embodiment of the present invention. This structure example has the same structure as the second embodiment, except that an output of a bypass switching unit 160 is input to a voltage/current measuring unit 150 through a signal line 169. According to the structure example of the third embodiment, the signal line 169 is provided and a voltage of the input side of the voltage converting unit 130 can be measured by the voltage/current measuring unit 150. Therefore, voltage conversion control can be performed in synchronization with path switching control. That is, because the MPP voltage of the power generating element 111 is obtained at the time of the path switching control, the voltage conversion control can be simplified using corresponding information as follows.

[Example of an Operation of the Storage Control Apparatus]

Figure 16:
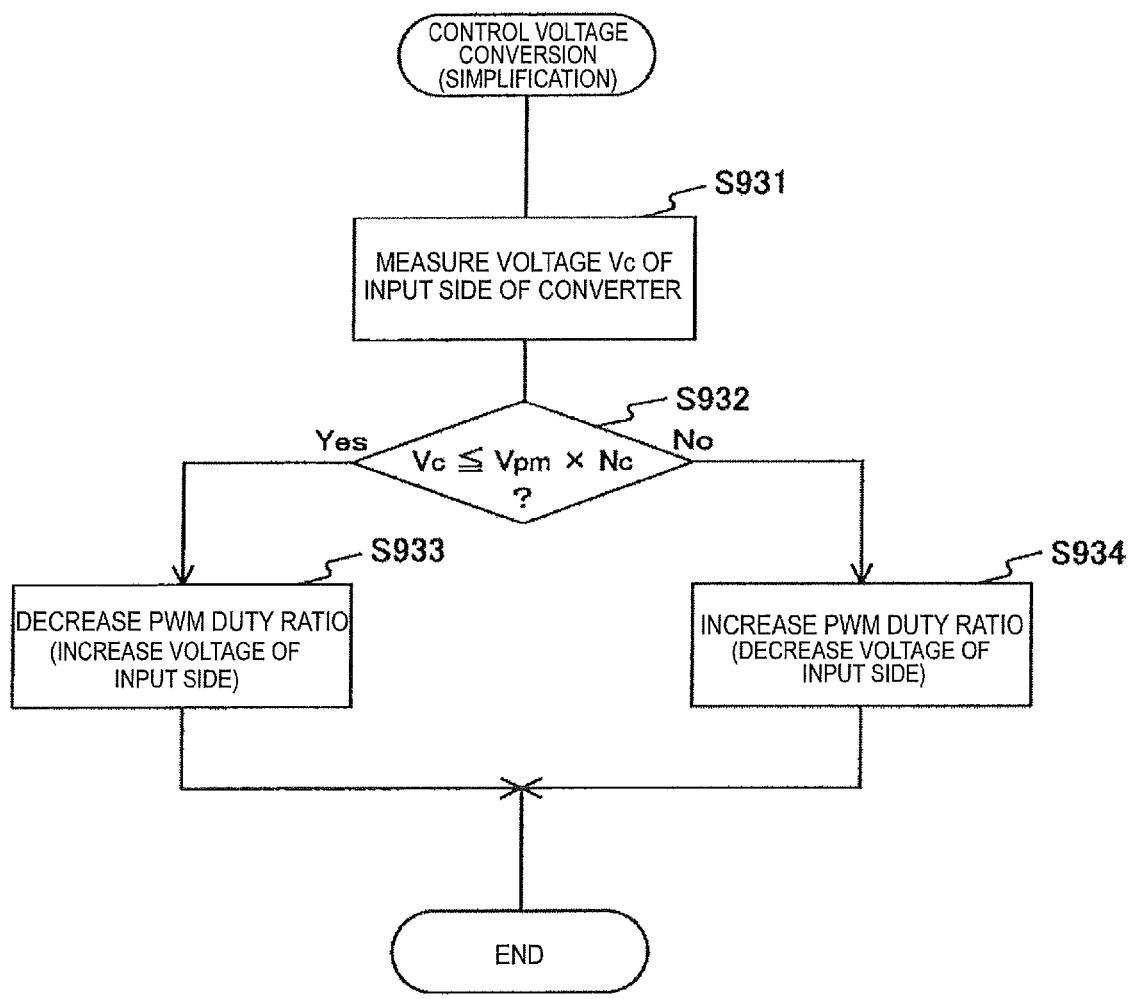
FIG. 16 is an illustration of an example of a process sequence of voltage conversion control (step S920) in the third embodiment of the present invention.

FIG. 16 is an illustration of an example of a process sequence of voltage conversion control (step S920) in the third embodiment of the present invention.

First, a voltage Vc of the input side of the voltage converting unit 130 is measured (step S931). Then, it is compared whether the voltage Vc is more than the product of the "MPP voltage Vpm of the power generating element" and the "number Nc of power generating elements 111 on the transformation path 139" (step S932). When Vc is (Vpm×Nc) or less (step S932: Yes), a control operation is performed such that the output voltage of the power generating element 111 is decreased by increasing the duty ratio of the voltage converting unit 130 (step S933). Meanwhile, when Vc is more than (Vpm×Nc) (step S932: No), a control operation is performed such that the output voltage of the power generating element 111 is increased by decreasing the duty ratio of the voltage converting unit 130 (step S934).

As such, according to the third embodiment of the present invention, the MPP voltage of the power generating element 111 can be obtained at the time of the path switching control by measuring the voltage of the input side of the voltage converting unit 130 by the voltage/current measuring unit 150, and the voltage conversion control can be simplified.

5. Fourth Embodiment

Example of a Structure of a Storage Control Apparatus

Figure 17:
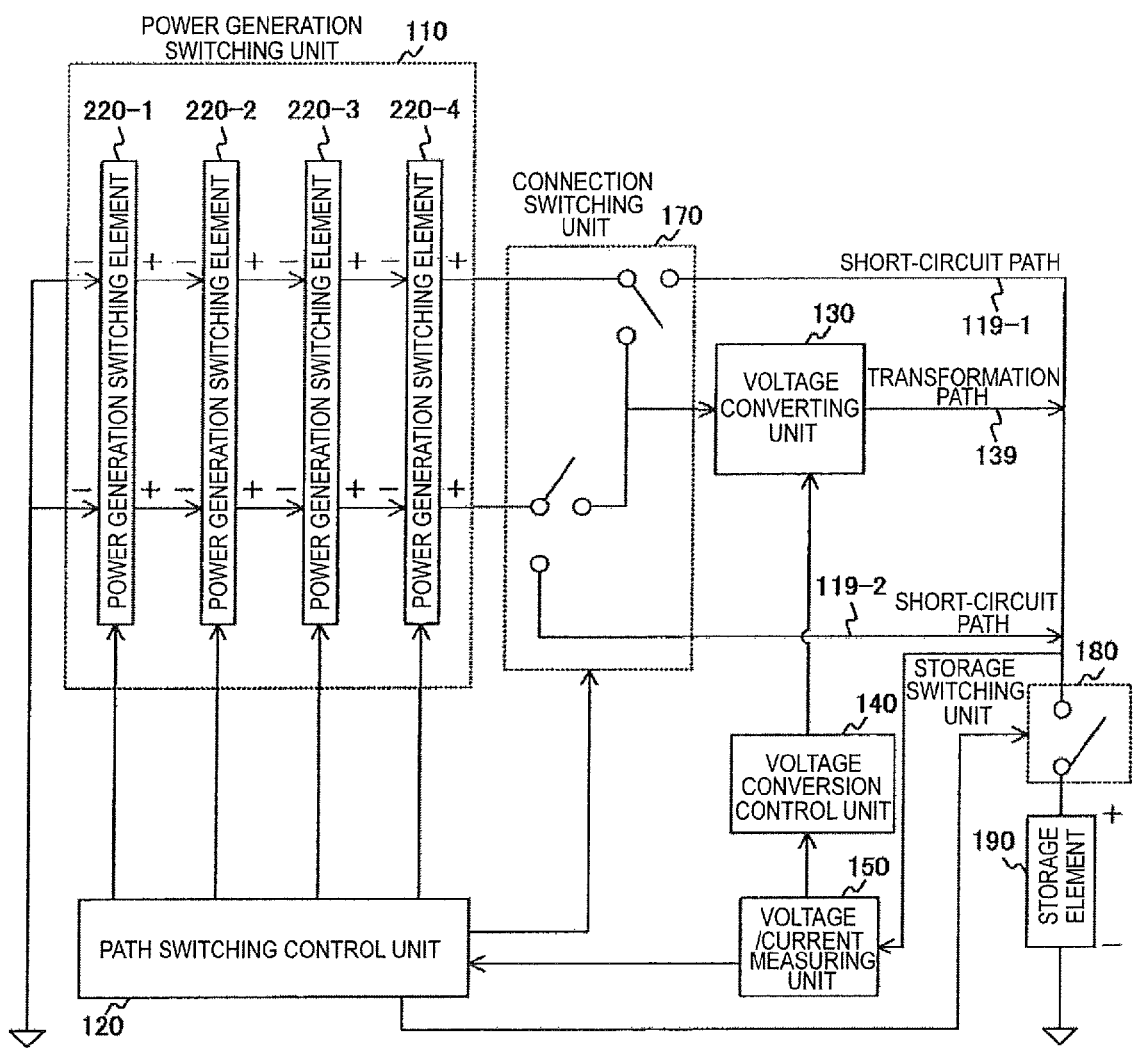
FIG. 17 is an illustration of an example of a structure of a storage control apparatus according to a fourth embodiment of the present invention.

FIG. 17 is an illustration of an example of a structure of a storage control apparatus according to a fourth embodiment of the present invention. A structure example of the fourth embodiment is different from the structure example of the second embodiment in that two short-circuit paths are provided and a connection switching unit 170 is provided, instead of the bypass switching unit 160. Because the other structure is the same as that of the structure example of the second embodiment, the description thereof is omitted herein.

The connection switching unit 170 is a switch that switches two paths from a power generation switching unit 110 into one of a short-circuit path 119-1 and a voltage converting unit 130 and one of a short-circuit path 119-2 and the voltage converting unit 130, respectively. That is, the connection switching unit 170 sorts a plurality of groups of power generating elements into groups needing conversion of a voltage level and groups not needing conversion of a voltage level and switches connection. Thereby, the path switching control unit 120 can control the number of power generating elements 111 connected to each path, according to a state transition as follows. In addition, it is permitted for the entire groups to become one group. Even though there are a plurality of transformation paths 139, it is permitted for all of the transformation paths 139 to be connected to one voltage converting unit 130.

For example, when the power generating element 111 is the solar battery, the power generating element 111 generally has a characteristic in which the MPP voltage increases under an environment where the illumination is high and decreases under an environment where the illumination is low. For this reason, under the environment where the illumination is high, parallelism of the power generating elements 111 is increased and a large current is supplied to the storage element 190. Under the environment where the illumination is low, the number of series of power generating elements 111 is increased and a charging voltage of the storage element 190 is secured. When the illumination becomes low, the power generating elements 111 are all connected in series and the voltage converting unit 130 is connected to a final stage. When the voltages of all of the power generating elements 111 do not reach an operation voltage of the voltage converting unit 130, a circuit enters a stop state. When the voltage of the power generating element reaches a constant value or more, the circuit enters an operation state.

[Example of a State Transition of the Storage Control Device]

Figure 18:
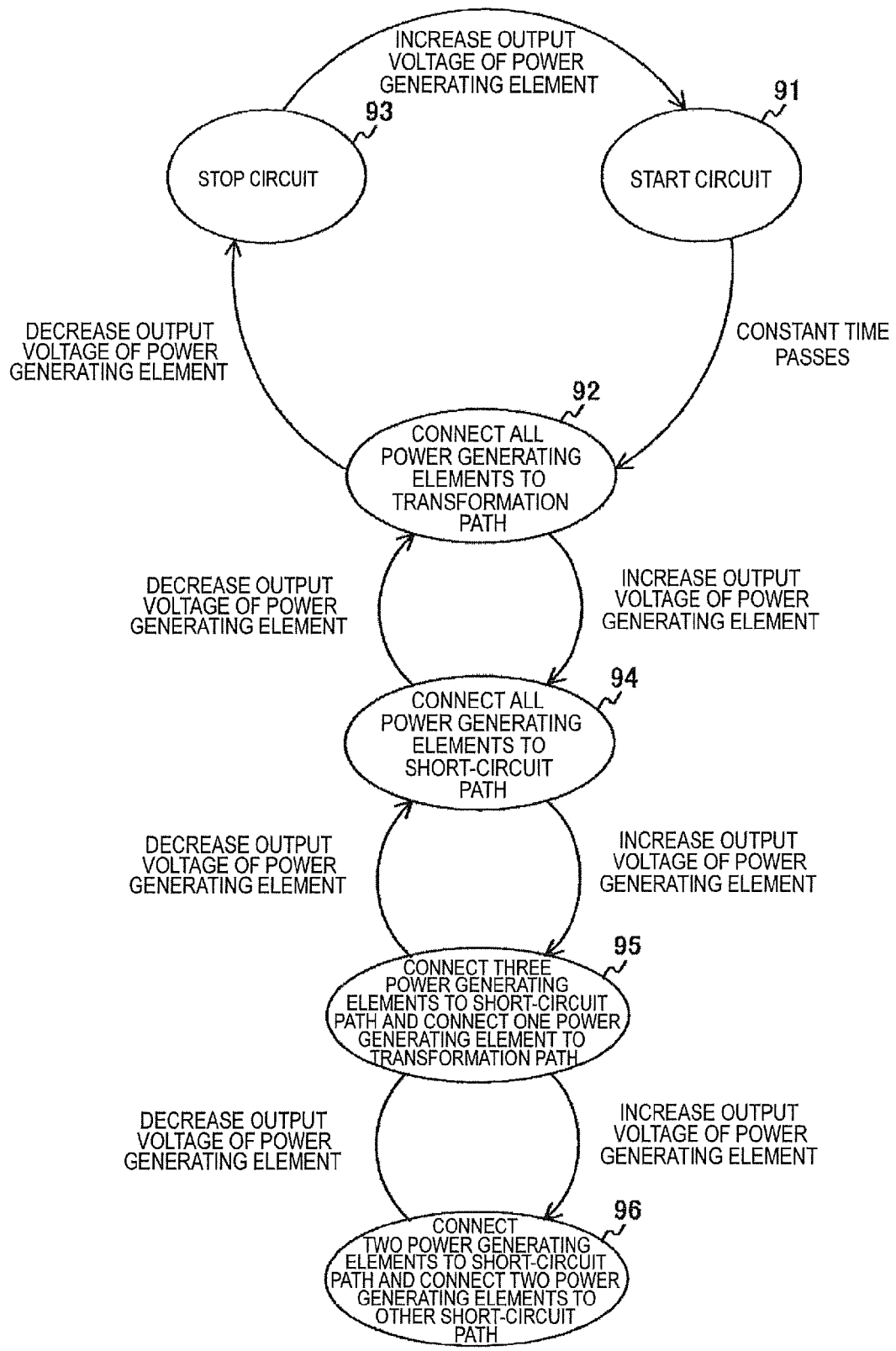
FIG. 18 is an illustration of an example of a state transition of the storage control apparatus according to the fourth embodiment of the present invention.

FIG. 18 is an illustration of an example of a state transition of the storage control apparatus according to the fourth embodiment of the present invention. In this case, six states of states 91 to 96 are assumed. First, an initial state in which a circuit of the storage control apparatus starts is the state 91. If a constant time passes after the state changes to the state 91, the state changes to the state 92.

In the state 92, all of the power generating elements 111 are connected to the transformation path 139. In the state 92, if an output voltage of the power generating element 111 decreases, the state changes to the state 93 and the circuit of the storage control apparatus is stopped. In the state 93, if an output voltage of the power generating element 111 increases, the state changes to the state 91 and the circuit of the storage control apparatus restarts.

In the state 92, if the output voltage of the power generating element 111 increases, the state changes to the state 94. In the state 94, all of the power generating elements 111 are connected to the short-circuit path 119. In the state 94, if the output voltage of the power generating element 111 increases, the state changes to the state 95. If the output voltage of the power generating element 111 decreases, the state changes to the state 92.

In the state 95, the three power generating elements 111 are connected to the short-circuit path 119 and one power generating element 111 is connected to the transformation path 139. In the state 95, if the output voltage of the power generating element 111 increases, the state changes to the state 96. If the output voltage of the power generating element 111 decreases, the state changes to the state 94.

In the state 96, the two power generating elements 111 are connected to the short-circuit path 119 and the two power generating elements 111 are connected to the transformation path 139. In the state 96, if the output voltage of the power generating element 111 decreases, the state changes to the state 95.

In the fourth embodiment, the voltage regulation method is applied regularly to each power generating element 111, the MPP voltage is measured, and control is performed according to the state transition. Thereby, in an environment where the output voltage of the power generating element 111 greatly changes, appropriate control can be performed.

6. Fifth Embodiment

Example of a Structure of a Storage Control Apparatus

Figure 19:
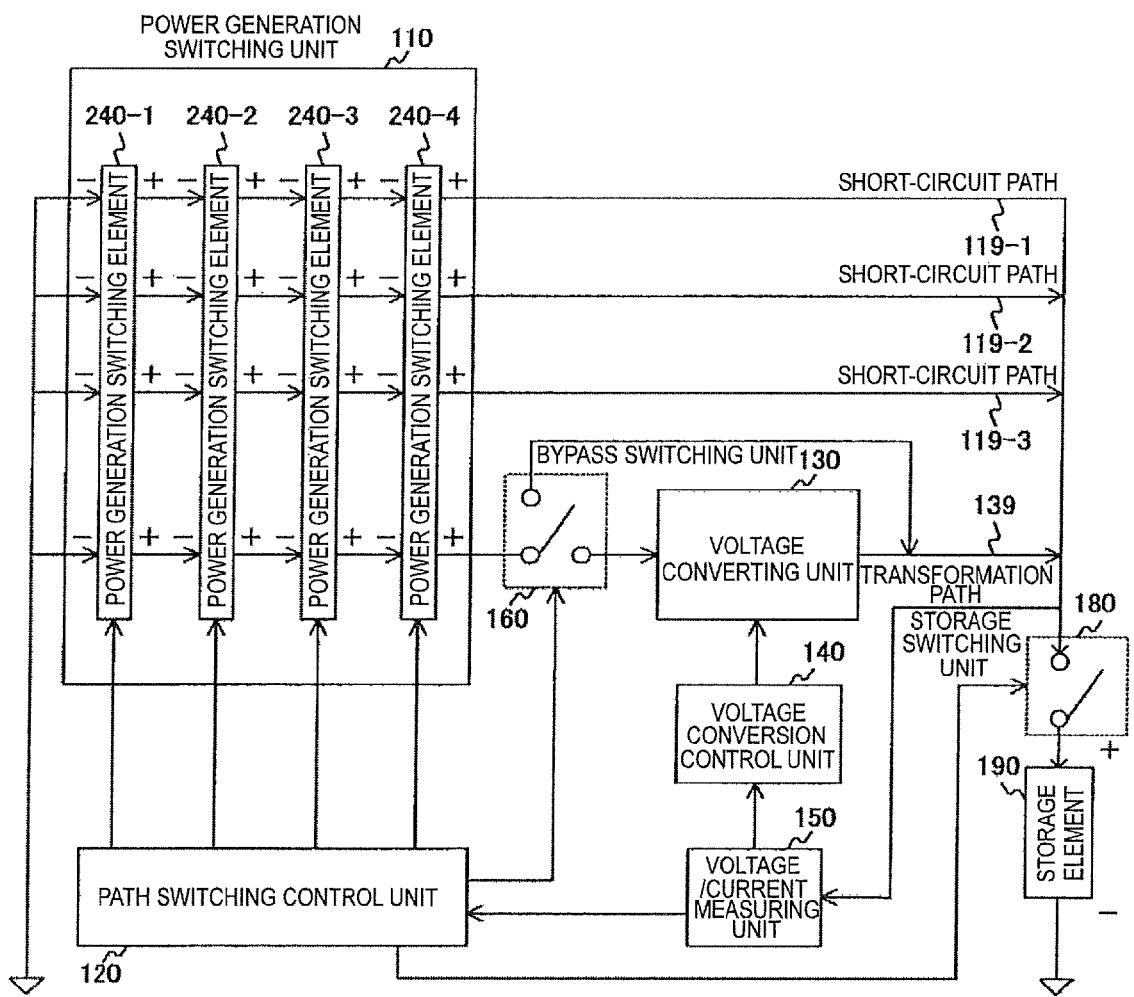
FIG. 19 is an illustration of an example of a structure of a storage control apparatus according to a fifth embodiment of the present invention.

FIG. 19 is an illustration of an example of a structure of a storage control apparatus according to a fifth embodiment of the present invention. The storage control apparatus according to the fifth embodiment is different from the power storage apparatus according to the second embodiment in that paths of a power generation switching unit 110 are increased to four and three short-circuit paths 119-1 to 119-3 are provided. Because the other structure is the same as that of the second embodiment, the description thereof is omitted herein.

The power generation switching unit 110 according to the fifth embodiment includes four power generation switching elements 240-1 to 240-4 each having four negative paths and four positive paths. A structure example of each of the power generation switching elements 240-1 to 240-4 will be described below with reference to the drawings. The power generation switching elements 240-1 to 240-4 may be generally called the power generation switching elements 240.

In the fifth embodiment, because the number of paths is four, the power generating elements 111 can be connected with a maximum of four parallel connections. When the MPP voltage of the power generating element 111 is 1 V, the MPP voltage can be set to any one of 1 V (four parallel connection), 2 V (two parallel connection), and 4 V (four series connection) without passing the voltage converting unit 130. Like other embodiments, when the number of paths is two, the MPP voltage that can be obtained without passing the voltage converting unit 130 becomes either 2 V (two parallel connection) or 4 V (four series connection). For this reason, if the number of short-circuit paths 119 increases, power loss by the voltage converting unit 130 can be minimized as compared with the case in which the number of short-circuit paths 119 decreases.

Figure 20:
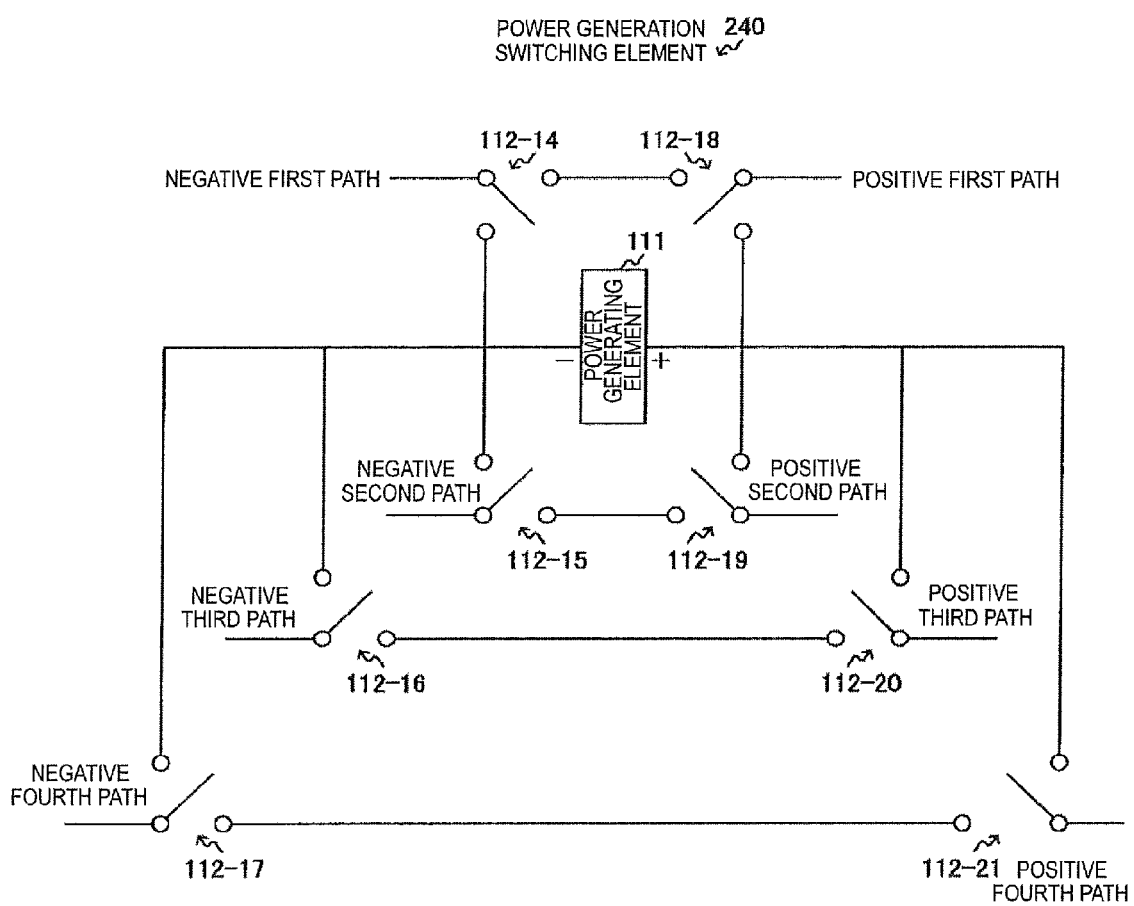
FIG. 20 is an illustration of an example of a structure of a power generation switching element 240 in the fifth embodiment of the present invention.

FIG. 20 is an illustration of an example of a structure of the power generation switching element 240 in the fifth embodiment of the present invention. In the structure example, the power generation switching element 240 includes one power generating element 111 and eight path switching units 112-14 to 112-21.

Each of the path switching units 112-14 to 112-17 is a switch that switches whether a negative terminal of the power generating element 111 is connected to each of the four negative paths. Each of the path switching units 112-18 to 112-21 is a switch that switches whether a positive terminal of the power generating element 111 is connected to each of the four positive paths. Thereby, the power generating elements 111 can be connected to any combination of the four negative paths and the four positive paths of the power generation switching element 240. The switching control of the path switching units 112-14 to 112-21 is executed by the path switching control unit 120.

[Example of an Operation of the Storage Control Apparatus]

Figure 21:
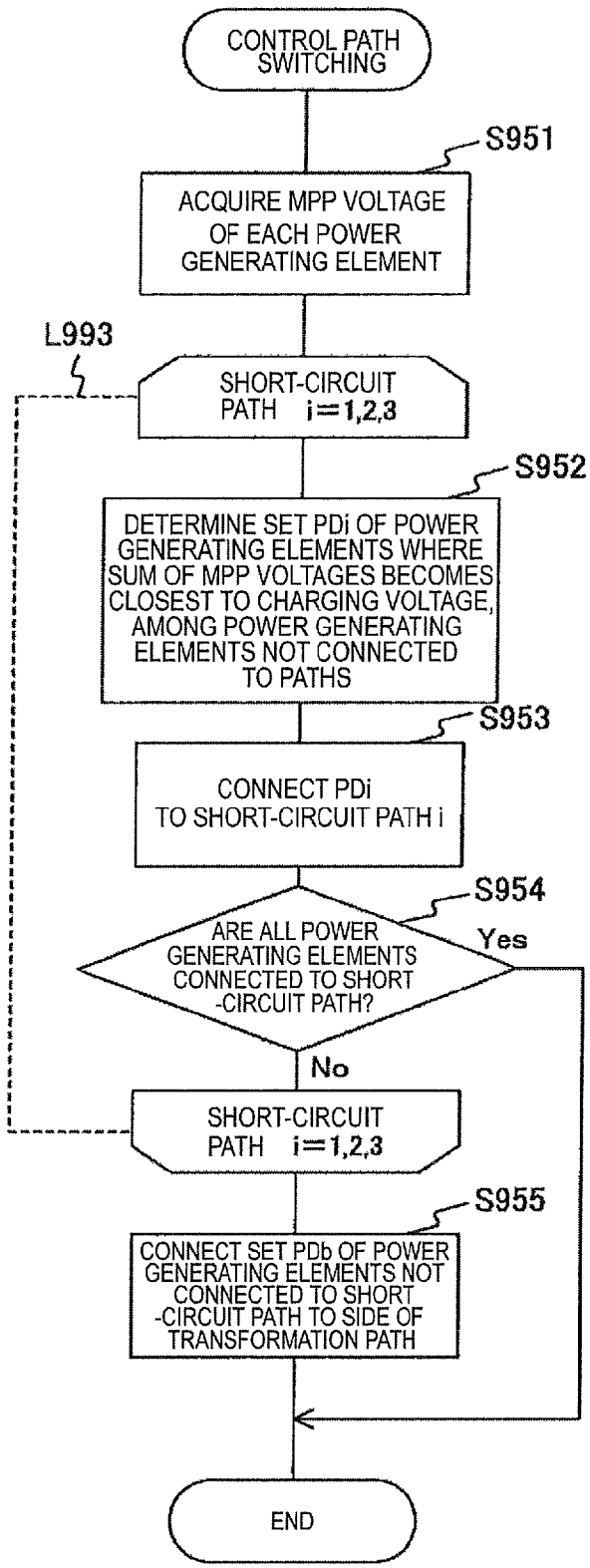
FIG. 21 is an illustration of an example of a process sequence of path switching control in the fifth embodiment of the present invention.

FIG. 21 is an illustration of an example of a process sequence of path switching control in the fifth embodiment of the present invention.

First, the MPP voltage of each power generating element 111 is acquired (step S951). With respect to each of the three short-circuit paths 119-1 to 119-3, processes of the following steps S952 to S954 are repeated using a variable i (=1, 2, 3) as an index (loop L993). Step S951 is an example of a maximum operation point voltage acquisition process described in the claims.

That is, a set PDi of power generating elements 111 where a sum of MPP voltages becomes most similar to a charging voltage is determined among the power generating elements 111 not connected to all of the paths (step S952). The power generating elements 111 that belong to the set PDi are connected to the short-circuit path 119-i (step S953). At this time, if all of the power generating elements 111 are connected to any short-circuit path 119 (step S954), the process of one example ends. Step S952 is an example of a group determination process described in the claims.

Meanwhile, when there are the power generating elements 111 not connected to any of the short-circuit paths 119 after the processes regarding the short-circuit paths 119-1 to 119-3, a set PDb of power generating elements 111 is connected to the side of the transformation path 139 (step S955).

As such, according to the fifth embodiment of the present invention, power loss by the voltage converting unit 130 can be minimized by increasing the number of short-circuit paths 119, as compared with the case in which the number of short-circuit paths 119 is small.

7. Sixth Embodiment

Example of a Structure of a Storage Control Apparatus

Figure 22:
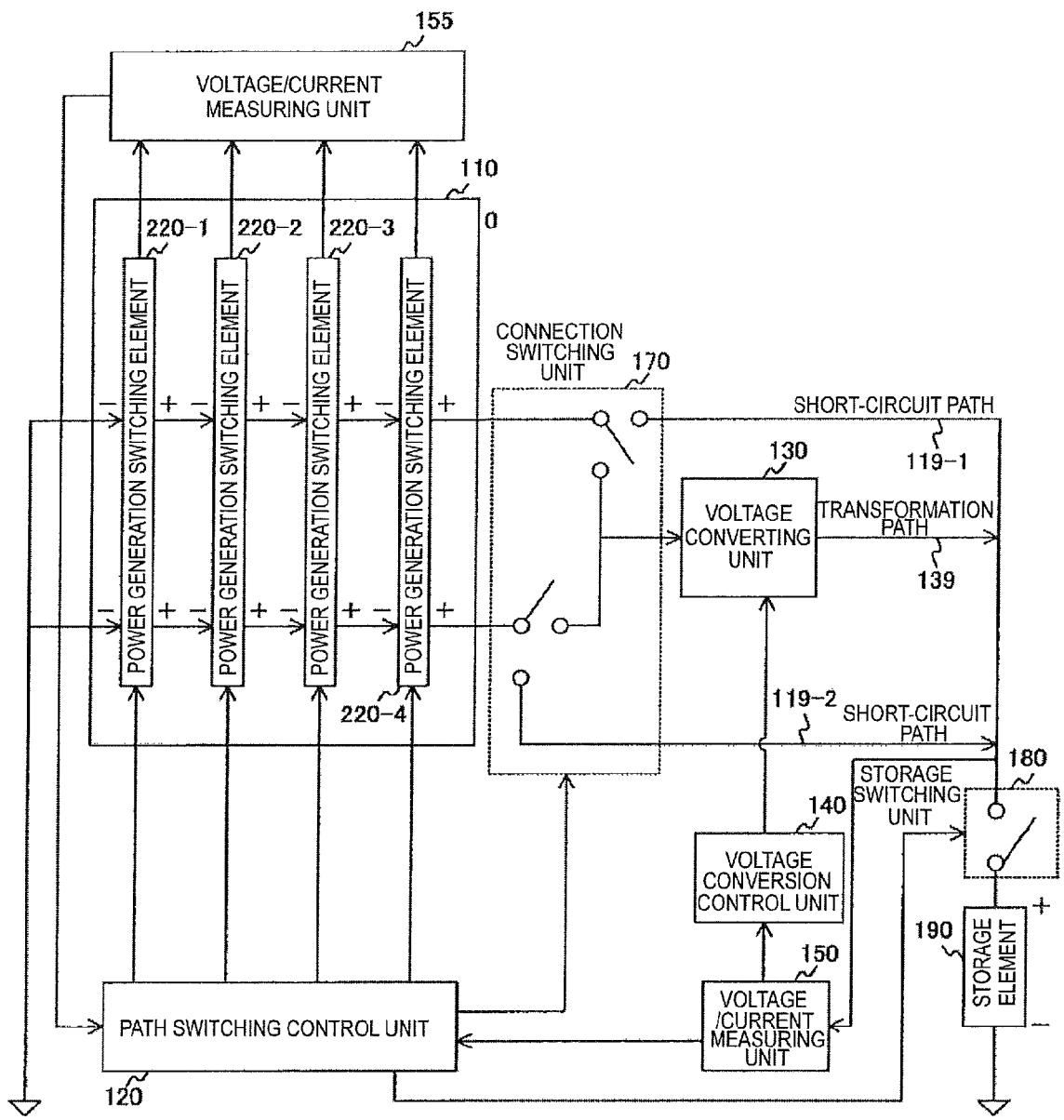
FIG. 22 is an illustration of an example of a structure of a storage control apparatus according to a sixth embodiment of the present invention.

FIG. 22 is an illustration of an example of a structure of a storage control apparatus according to a sixth embodiment of the present invention. In power generating elements that have a property as a current source such as a solar battery, if a power generating element having a small output and a power generating element having a large output are connected in series, a current that is more than a current of the power generating element having the small output is not obtained. Therefore, in the sixth embodiment, a plurality of short-circuit paths 119 are provided to connect the power generating element having the large output and the power generating element having the small output to different paths, respectively.

In the sixth embodiment, because output voltages of all of the power generating elements 111 in a power generation switching unit 110 need to be measured, a voltage/current measuring unit 155 is provided. Because the other structure is the same as that of the fourth embodiment, the description thereof is omitted herein.

[Example of an Operation of the Storage Control Apparatus]

Figure 23:
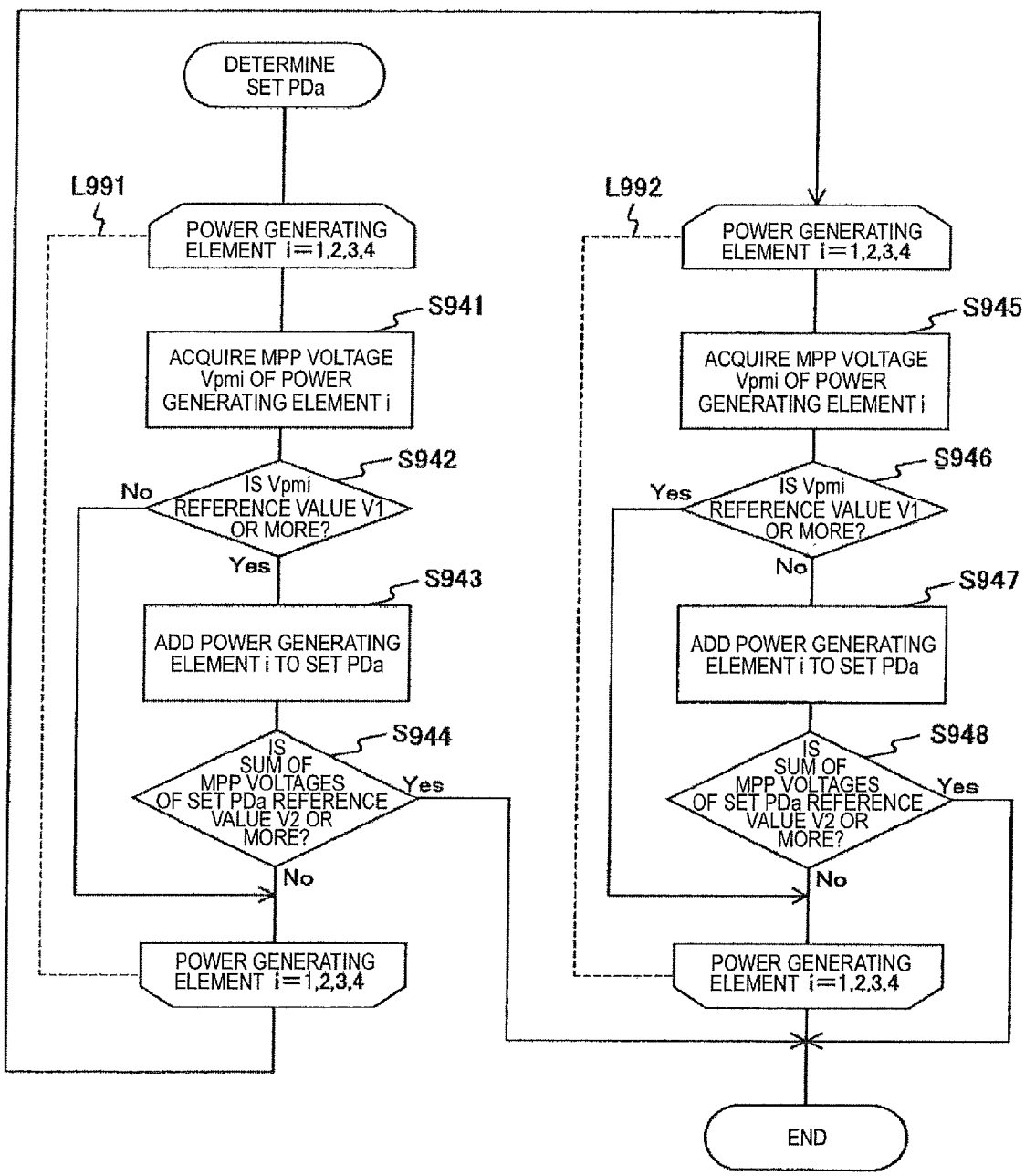
FIG. 23 is an illustration of an example of a process sequence of determination of a set PDa in the sixth embodiment of the present invention.

FIG. 23 is an illustration of an example of a process sequence of determination of a set PDa in the sixth embodiment of the present invention. An entire process sequence of power switching control is the same as that of the first embodiment described with reference to FIG. 8 and a process for determining the set PDa corresponds to steps S911 and S912 in FIG. 8. However, a set of power generating elements 111 connected to the short-circuit path 119 is selected from the power generating elements 111 having large output currents and a set of power generating elements 111 connected to a transformation path 139 is selected from the power generating elements 111 having small output currents. Thereby, entire power loss by the power generating elements 111 having the small outputs is decreased. As one example, the case in which K is 4, that is, the number of power generating elements 111 is four will be described.

First, in a loop L991, the following process is executed with respect to each of the power generating elements 111-1 to 111-4. In this case, it is assumed that an MPP voltage and an MPP current are proportional to each other and the power generating elements where the MPP voltage is more than a predetermined reference value V1 are preferentially added to the set PDa. First, an MPP voltage Vpm1 of the power generating element 111-1 is acquired (step S941). If the MPP voltage Vpm1 is less than the predetermined reference voltage V1 (step S942), the process proceeds to a process regarding the next power generating element 111-2. If the MPP voltage Vpm1 is the predetermined reference voltage V1 or more (step S942), the power generating element 111-1 is added as an element of the set PDa (step S943). At this time, if a sum of MPP voltages of the power generating elements 111 belonging to the set PDa is a predetermined reference value V2 or more, the process ends and the set PDa is determined (step S944). Meanwhile, if the sum of the MPP voltages of the power generating elements 111 belonging to the set PDa is less than the predetermined reference value V2, an MPP voltage Vpm2 of the next power generating element 111-2 is acquired (step S941) and the process in the loop 991 is repeated. Step S941 is an example of an MPP voltage acquisition process described in the claims. Step S943 is an example of a group determination process described in the claims.

Next, in a loop L992, the following process is executed with respect to each of the power generating elements 111-1 to 111-4. In this case, when the sum of the MPP voltages of the set PDa does not reach the predetermined reference value V2, the power generating elements where the MPP point voltage is less than the predetermined reference value V1 are added to the set PDa. First, an MPP voltage Vpm1 of the power generating element 111-1 is acquired (step S945). If the MPP voltage Vpm1 is the predetermined reference voltage V1 or more (step S946), the process proceeds to a process regarding the next power generating element 111-2. If the MPP voltage Vpm1 is less than the predetermined reference voltage V1 (step S946), the power generating element 111-1 is added as an element of the set PDa (step S947). At this time, if the sum of MPP voltages of the power generating elements 111 belonging to the set PDa is a predetermined reference value V2 or more, the process ends and the set PDa is determined (step S948). Meanwhile, if the sum of the MPP voltages of the power generating elements 111 belonging to the set PDa is less than the predetermined reference value V2, an MPP voltage Vpm2 of the next power generating element 111-2 is acquired (step S945) and the process in the loop 992 is repeated. Step S945 is an example of an MPP voltage acquisition process described in the claims. Step S947 is an example of a group determination process described in the claims.

As such, according to the sixth embodiment of the present invention, entire power loss by the power generating elements 111 having the small outputs can be decreased by individually measuring the output voltage of the power generating element 111 and using the plurality of short-circuit paths 119. The sixth embodiment is particularly effective when the outputs of some of the power generating elements 111 become weak due to an influence of shading.

8. Seventh Embodiment

Example of a Structure of a Storage Control Apparatus

Figure 24:
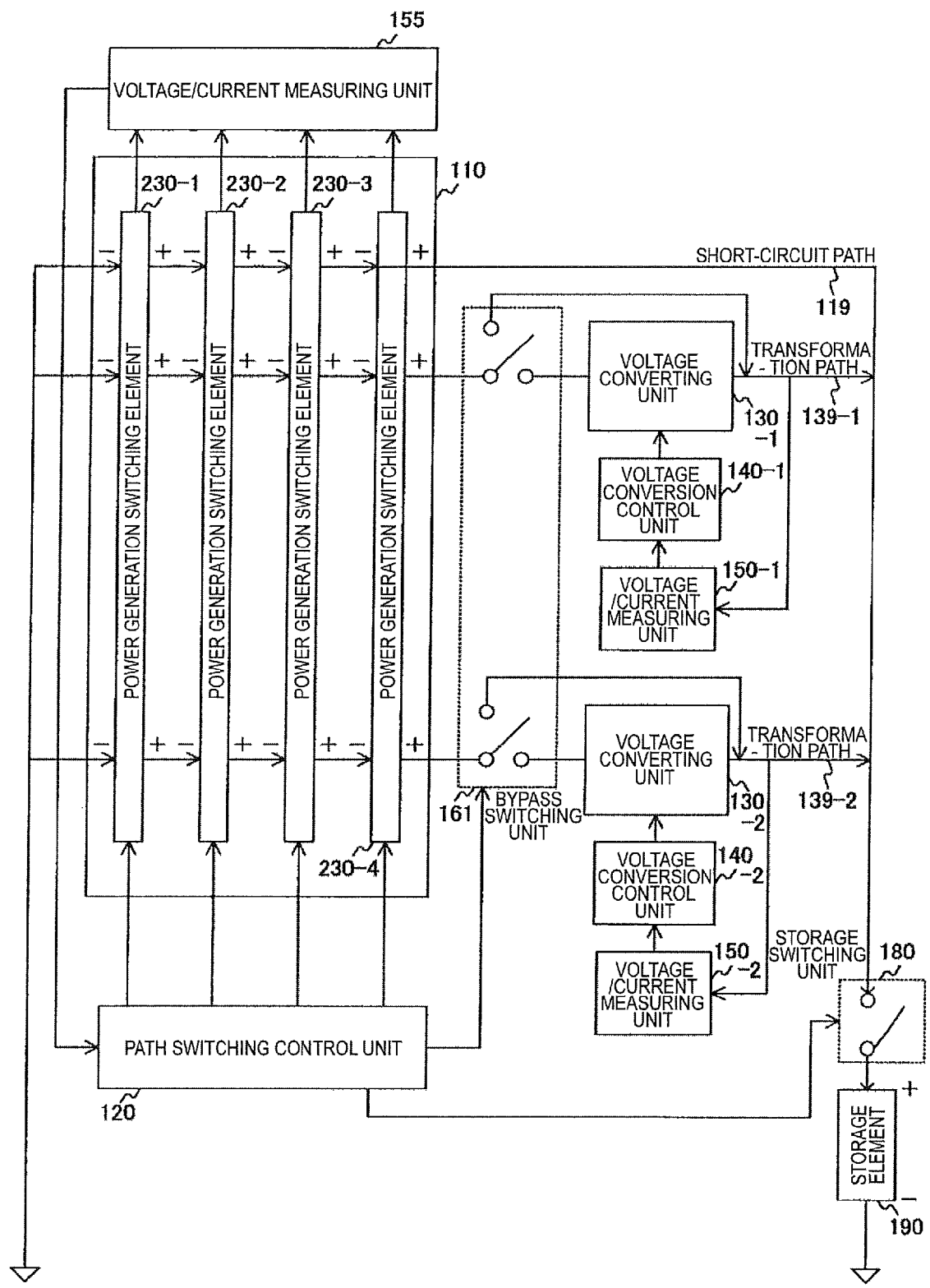
FIG. 24 is an illustration of an example of a structure of a storage control apparatus according to a seventh embodiment of the present invention.

FIG. 24 is an illustration of an example of a structure of a storage control apparatus according to a seventh embodiment of the present invention.

In the sixth embodiment described above, the solar batteries having the different illuminations may be connected to one transformation path 139. For example, the case in which the charging voltage of the storage element 190 is 4 V, the output voltage of each of the three power generating elements 111-1 to 111-3 is 2 V (high output current), and the output voltage of one power generating element 111-4 is 1 V (low output current) is assumed. In this case, the power generating element 111-3 having the output voltage of 2 V and the power generating element 111-4 having the output voltage of 1 V need to be connected to the transformation path 139, the current that is input to the voltage converting unit 130 decreases. Therefore, in the seventh embodiment, different from the sixth embodiment, a plurality of transformation paths 139 are provided. Thereby, the power generating element 111 having the different output current can be connected to the different transformation path 139 and output power can be obtained from an arbitrary path with high efficiency. For example, the power generating element 111-3 is connected to the transformation path 139-1 and the power generating element 111-4 is connected to the transformation path 139-4.

According to the above structure, a plurality of voltage converting units 130, a plurality of voltage conversion control units 140, and a plurality of voltage/current measuring units 150 are provided and a switch in a bypass switching unit 161 is separated into a plurality of paths. Each of the four power generation switching elements 230-1 to 230-4 in the power generation switching unit 110 has three negative paths and three positive paths. The power generation switching elements 230-1 to 230-4 may be generally called the power generation switching elements 230. Because the other structure is the same as that of the sixth embodiment, the description thereof is omitted herein.

[Example of an Operation of the Storage Control Apparatus]

Figure 25:
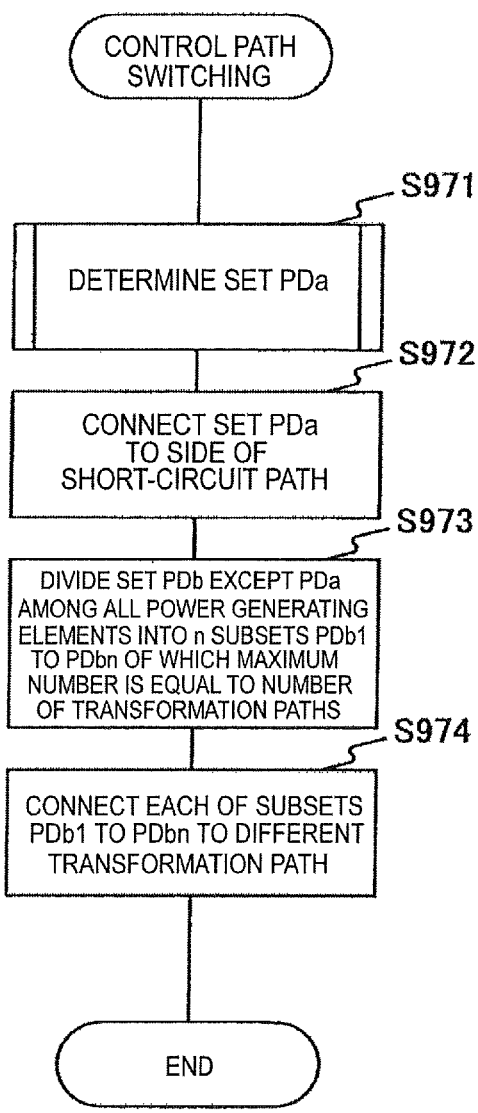
FIG. 25 is an illustration of an example of a process sequence of path switching control in the seventh embodiment of the present invention.

FIG. 25 is an illustration of an example of a process sequence of path switching control in the seventh embodiment of the present invention.

First, a set PDa that has the power generating elements 111 to be connected to a short-circuit path as elements is determined (step S971). The set PDa can be determined by the same sequence as the process sequence of the sixth embodiment described with reference to FIG. 23. The power generating elements 111 that belong to the set PDa determined in the above-described manner are connected to the side of the short-circuit path 119 (step S972).

Next, a set PDb other than the set PDa among all of the power generating elements 111 is divided into n subsets PDb1 to PDbn of which the maximum number is equal to the number of transformation paths 139 (step S973). At this time, MPP voltages, MPP currents, open voltages, and short-circuit currents of the power generating elements 111 that belong to the set PDb are compared with (n−1) reference values and the power generating elements 111 are divided into subsets. Also, a classification method such as K-means may be used. The power generating elements 111 that belong to the divided subsets PDb1 to PDbn are connected to the n transformation paths 139, respectively (step S974).

As such, according to the seventh embodiment of the present invention, output power can be obtained from an arbitrary path with high efficiency, by individually measuring the output voltage of the power generating element 111 and using the plurality of transformation paths 139. The seventh embodiment is particularly effective when the outputs of some of the power generating elements 111 become weak due to an influence of shading.

9. Modification

Figure 26:
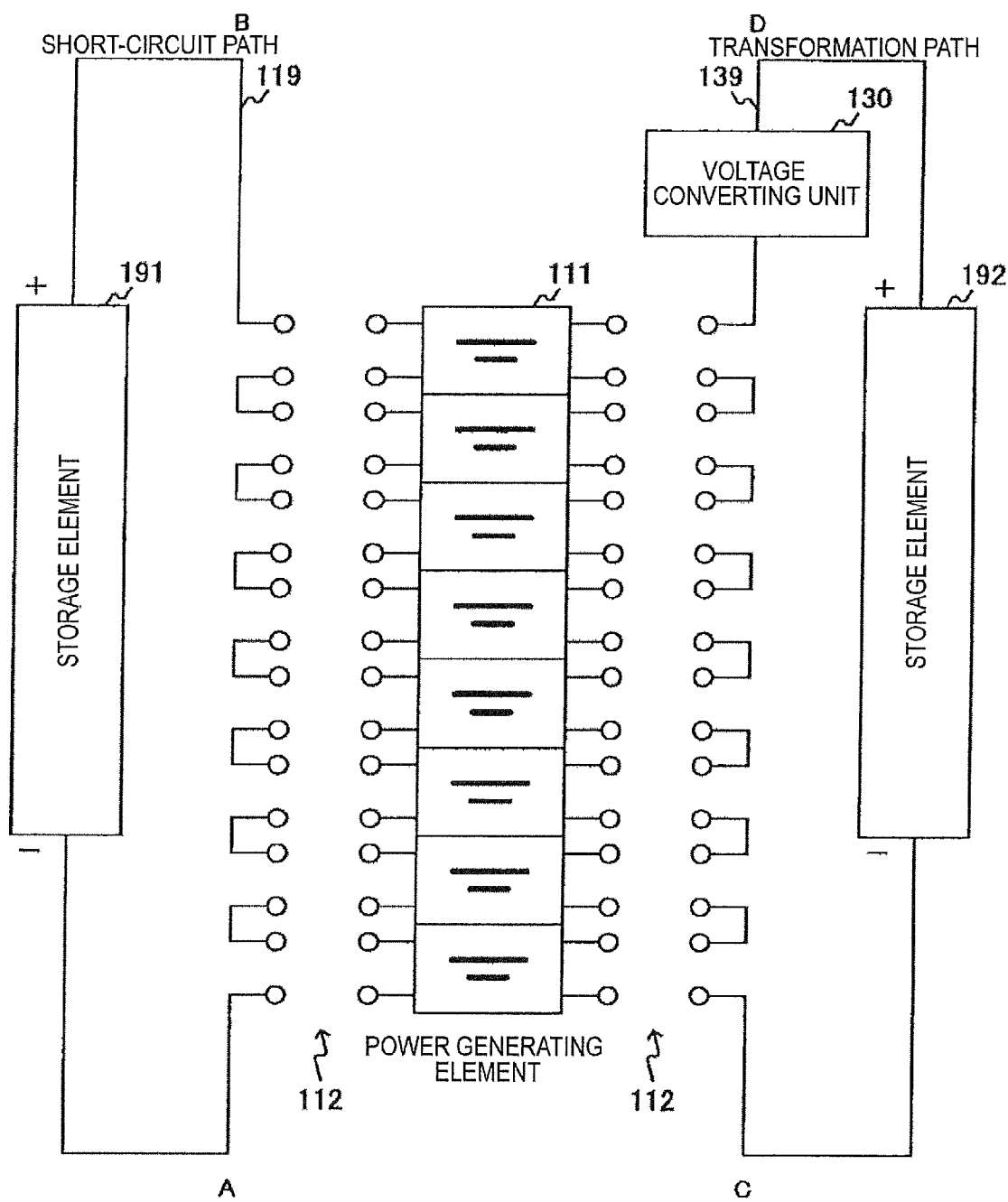
FIG. 26 is an illustration of another example of connection between the storage control apparatus and the storage element according to the embodiment of the present invention.

In the embodiments described above, the outputs are supplied from the short-circuit path 119 and the transformation path 139 to the same storage element 190. However, the present invention is not limited thereto. For example, as illustrated in FIG. 26, storage elements 191 and 192 may be connected to a short-circuit path 119 and a transformation path 139, respectively. Thereby, the voltage can be adjusted to fall within a range of an appropriate charging voltage of each of the storage elements 191 and 192. The storage element 191 is an example of a first storage element described in the claims and the storage element 192 is an example of a second storage element described in the claims.

The embodiments of the present invention are examples to implement the prevent invention. As stated clearly in the embodiments of the present invention, the items in the embodiments of the present invention and the invention specification items in claims have a correspondence relation. Likewise, the invention specification items in claims and the items in the embodiments of the present invention to which the same names as those of the invention specification items are given have a correspondence relation. However, the present invention is not limited to the embodiments and various medications can be made within a range that does not depart from the scope of the present invention.

The process sequences that have been described in the embodiments of the present invention may be understood as a method having a series of sequences or a program for executing a computer to execute the series of sequences and a recording medium storing the program. As the recording medium, a compact disc (CD), a minidisc (MD), a digital versatile disc (DVD), a memory card, and a Blu-ray disc (registered trademark) may be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A storage control apparatus comprising:
a plurality of power generating elements that generate electromotive force;
a path switching unit that performs path switching such that the plurality of power generating elements are divided into a plurality of groups and a path is formed for each group;
a short-circuit path that supplies outputs of some groups among the plurality of groups to a storage element;
a voltage converting unit that converts voltage levels of outputs other than those of the some groups among the plurality of groups;
a transformation path that supplies an output of the voltage converting unit to the storage element; and
a bypass switching unit that performs switching to bypass the voltage converting unit, when a difference between an input voltage of the voltage converting unit in the transformation path and a voltage of a side connected to the storage element in the short-circuit path is settled within a predetermined range, even when the voltage conversion is not performed.

2. The storage control apparatus according to claim 1, further comprising:
a path switching control unit that controls the path switching in the path switching unit; and
a voltage conversion control unit that controls a transformation rate of the voltage conversion in the voltage converting unit,
wherein the path switching control unit and the voltage conversion control unit control a voltage of a side connected to the storage element, such that maximum power is obtained from the power generating elements in the transformation path.

3. A storage control apparatus comprising:
a power generation switching unit that includes a plurality of power generating elements that generate electromotive force;
a path switching unit that performs path switching such that the plurality of power generating elements are divided into a plurality of groups and a path is formed for each group;
a connection switching unit that sorts the plurality of groups into groups needing conversion of a voltage level and groups not needing conversion of a voltage level and performs connection switching;
a first short-circuit path that is capable of providing selected outputs of the groups not needing the conversion of the voltage level among the plurality of groups to a storage element;
a second short-circuit path that is capable of providing selected outputs of other of the groups not needing the conversion of the voltage level among the plurality of groups to the storage element;

a voltage converting unit that converts voltage levels of outputs of the groups needing the conversion of the voltage levels among the plurality of groups; and transformation paths that supply an output of the voltage converting unit to the storage element, wherein the connection switching unit switches two paths from the power generation switching unit into one of the first short-circuit path and the voltage converting unit and the second short-circuit path and the voltage connecting unit respectively;

wherein the path switching unit and the connection switching unit are capable of performing switching such that some or all of the plurality of power generating elements are connected in series to a transformation path included in the transformation paths.

4. A storage control method in a storage control apparatus, the control apparatus comprising:

a plurality of power generating elements that generate electromotive force;

a path switching unit that performs path switching such that the plurality of power generating elements are divided into a plurality of groups and a path is formed for each group;

a short-circuit path that supplies outputs of some groups among the plurality of groups to a storage element;

a voltage converting unit that converts voltage levels of outputs other than those of the some groups among the plurality of groups; and a transformation path that supplies an output of the voltage converting unit to the storage element, the storage control method comprising:

a maximum power point voltage acquisition process of acquiring maximum power point voltages of the plurality of power generating elements;

a group determination process of determining a set of the power generating elements where a sum of the maximum power point voltages falls within a range of an appropriate charging voltage of the storage element, among the plurality of power generating elements, as the some groups; and a connection process of connecting the power generating elements belonging to the some groups to the short-circuit path and connecting the other power generating elements to the voltage converting unit.

* * * * *